US012378097B2

(12) United States Patent
Yuksel

(10) Patent No.: US 12,378,097 B2
(45) Date of Patent: Aug. 5, 2025

(54) VARIABLE SPEED MOVING WALKWAY SYSTEMS

(71) Applicant: Beltways Inc., Cincinnati, OH (US)

(72) Inventor: Edip Yuksel, Cincinnati, OH (US)

(73) Assignee: Beltways Inc., Cincinnati, OH (US)

( * ) Notice: Subject to any disclaimer, the term of this patent is extended or adjusted under 35 U.S.C. 154(b) by 0 days.

(21) Appl. No.: 16/698,235

(22) Filed: Nov. 27, 2019

(65) Prior Publication Data

US 2020/0095097 A1 Mar. 26, 2020

Related U.S. Application Data

(60) Continuation-in-part of application No. 16/113,966, filed on Aug. 27, 2018, now abandoned, which is a (Continued)

(51) Int. Cl.
*B66B 21/02* (2006.01)
*B66B 21/00* (2006.01)
(Continued)

(52) U.S. Cl.
CPC ............ *B66B 21/025* (2013.01); *B66B 21/00* (2013.01); *B66B 21/12* (2013.01); *E04H 1/005* (2013.01);
(Continued)

(58) Field of Classification Search
CPC ....... B66B 21/025; B66B 21/00; B66B 21/12; B66B 21/06; B66B 21/04; B66B 21/10;
(Continued)

(56) References Cited

U.S. PATENT DOCUMENTS 406,314 A 7/1889 Souder .................... B66B 21/08
629,289 A 7/1899 Dodge .................... B66B 21/06
(Continued)

FOREIGN PATENT DOCUMENTS

DE 2325967 12/1974 ............ B66B 21/06
EP 0074197 3/1983 ............ B66B 21/12
(Continued)

OTHER PUBLICATIONS

International Search Report issued in application No. PCT/US 16/20451, dated Aug. 5, 2016 (12 pgs).

(Continued)

*Primary Examiner* — Babajide A Demuren
(74) *Attorney, Agent, or Firm* — Hall Estill Law Firm

(57) ABSTRACT

A variable speed moving walkway system has a plurality of walkway modules, each having at least one movable belt, wherein each of the plurality of walkway modules are positioned at least one of: immediately linearly adjacent or immediately laterally adjacent to another. The movable belt of each walkway module moves at a different speed from the belt of an immediately linearly adjacent and/or an immediately laterally adjacent walkway module. A transition between the walkway modules may include a stationary wedge and at least one rotational brush positioned in a gap formed between the stationary wedge and the at least one belt of each walkway module, and/or a transition T-bar positioned between the at least two walkway modules.

14 Claims, 18 Drawing Sheets

Related U.S. Application Data division of application No. 15/058,680, filed on Mar. 2, 2016, now Pat. No. 10,059,568.

(60) Provisional application No. 62/773,793, filed on Nov. 30, 2018, provisional application No. 62/126,824, filed on Mar. 2, 2015.

(51) Int. Cl.

| | |
|---|---|
| ***B66B 21/12*** | (2006.01) |
| ***E04H 1/00*** | (2006.01) |
| *B66B 21/04* | (2006.01) |
| *B66B 21/06* | (2006.01) |
| *B66B 21/08* | (2006.01) |
| *B66B 21/10* | (2006.01) |

(52) U.S. Cl.
CPC ............... *B66B 21/02* (2013.01); *B66B 21/04* (2013.01); *B66B 21/06* (2013.01); *B66B 21/08* (2013.01); *B66B 21/10* (2013.01)

(58) Field of Classification Search
CPC ......... B66B 21/02; B66B 21/08; B66B 29/08; B66B 29/02; E04H 1/005
See application file for complete search history.

(56) References Cited

U.S. PATENT DOCUMENTS

| | | | | | |
|---|---|---|---|---|---|
| 1,277,614 | A | | 9/1918 | Lowrey | |
| 2,268,724 | A | * | 1/1942 | Shackelford | B65G 47/66 198/600 |
| 2,624,444 | A | * | 1/1953 | Casabona | B65G 47/66 198/560 |
| 2,823,785 | A | | 2/1958 | Hefti | 198/17 |
| 2,905,100 | A | | 9/1959 | Kendall et al. | 104/25 |
| 3,482,529 | A | | 12/1969 | Paul | 104/25 |
| 3,592,140 | A | | 7/1971 | Zuppiger | 104/25 |
| 3,621,980 | A | | 11/1971 | Folkes | B65G 15/02 |
| 3,727,558 | A | | 4/1973 | Winkle | B66B 29/08 |
| 3,899,067 | A | | 8/1975 | Kondo | B66B 23/26 |
| 4,444,302 | A | | 4/1984 | Dunstan | B66B 21/12 |
| 5,044,485 | A | * | 9/1991 | Loder | B66B 21/12 198/325 |
| 5,971,129 | A | | 10/1999 | Stawniak et al. | 198/325 |
| 6,164,435 | A | * | 12/2000 | Coen | B65G 47/66 198/600 |
| 6,170,632 | B1 | | 1/2001 | Shimura | B66B 21/12 |
| 6,454,079 | B1 | | 9/2002 | Teramoto | B65G 23/30 |
| 6,604,621 | B1 | * | 8/2003 | Matsuo | B66B 21/12 198/324 |
| 6,978,875 | B2 | * | 12/2005 | Diaz | B66B 29/08 198/325 |
| 8,104,600 | B2 | | 1/2012 | Sanchez Pineiro | B66B 21/08 |
| 8,365,899 | B2 | * | 2/2013 | McKee | B65G 47/66 198/539 |
| 8,960,097 | B2 | | 2/2015 | Fritsche | 104/53 |
| 9,452,896 | B2 | * | 9/2016 | Lee | B65G 47/66 |
| 9,663,306 | B2 | * | 5/2017 | Pettinga | B65G 47/66 |
| 10,059,568 | B2 | | 8/2018 | Yuksel | B66B 21/025 |
| 2011/0059821 | A1 | | 3/2011 | Lee et al. | 474/8 |
| 2013/0062157 | A1 | | 3/2013 | Betancourt | 198/334 |
| 2014/0321698 | A1 | | 10/2014 | Chao et al. | 382/103 |

FOREIGN PATENT DOCUMENTS

| | | | | | |
|---|---|---|---|---|---|
| EP | 290255 | A2 | * | 11/1988 | |
| EP | 0415953 | | | 8/1992 | B66B 21/06 |
| EP | 0854108 | A1 | * | 7/1998 | B66B 29/08 |
| FR | 330546 | | | 8/1903 | B66B 21/06 |
| FR | 390604 | | | 10/1908 | B66B 21/06 |
| FR | 2431406 | | | 2/1980 | B66B 21/12 |
| GB | 203187 | | | 9/1923 | B66B 21/06 |
| GB | 1176444 | | | 1/1970 | B66B 21/12 |
| GB | 2230753 | | | 3/1993 | B66B 21/06 |
| GB | 2316927 | | | 8/1998 | B66B 21/04 |
| JP | H092766 | | | 1/1997 | B66B 21/04 |
| JP | H09110350 | | | 4/1997 | B66B 21/10 |
| JP | 3624316 | B2 | * | 3/2005 | B66B 21/10 |
| WO | WO-0035801 | A1 | * | 6/2000 | B66B 21/12 |

OTHER PUBLICATIONS

"B- and-Bee camping concept proposes stackable sleeping cells for festivals", Datasheet [online], Dezeen Magazine, Jul. 24, 2014 {retrieved on Aug. 8, 2016]. Retrieved from the Internet: URL:http://www.dezeen.com/2014/07/24/b-and-bee-camping-concept-stackable-sleep-cells-festivals/ (27 pgs).
PCT Invitation to Pay Additional Fees issued in application No. PCT/US16/20451, dated May 12, 2016 (2 pgs).
International Preliminary Report on Patentability issued in application No. PCT/US2016/020451, dated Sep. 14, 2017 (9 pgs).
Office Action issued in U.S. Appl. No. 15/058,680, dated May 1, 2017 (10 pgs).
Office Action issued in U.S. Appl. No. 15/058,680, dated Nov. 1, 2017 (13 pgs).
Office Action issued in U.S. Appl. No. 15/058,680, dated Dec. 2, 2016 (17 pgs).
Office Action issued in U.S. Appl. No. 15/058,680, dated Apr. 12, 2018 (9 pgs).
Notice of Allowance issued in U.S. Appl. No. 15/058,680, dated Apr. 25, 2018 (5 pgs).
Office Action issued in U.S. Appl. No. 16/113,966, dated Jul. 8, 2019 (10 pgs).
Office Action issued in U.S. Appl. No. 16/113,966, dated Nov. 26, 2019 (7 pgs).

* cited by examiner

VARIABLE SPEED MOVING WALKWAY SYSTEMS

CROSS REFERENCE TO RELATED APPLICATION

This application is a continuation-in-part application of U.S. patent application Ser. No. 16/113,966 filed Aug. 27, 2018, which itself is a divisional of U.S. patent application Ser. No. 15/058,680, filed Mar. 2, 2016, which in turn claims priority from U.S. Provisional Application Ser. No. 62/126,824, filed Mar. 2, 2015; and this application also claims priority to U.S. Provisional Application Ser. No. 62/773,793 filed Nov. 30, 2018, the contents of which are incorporated herein by reference.

FIELD OF THE DISCLOSURE

This disclosure generally relates to transportation devices and systems, and more particularly, to variable speed moving walkway systems.

BACKGROUND OF THE DISCLOSURE

Efficient usage of space is an important consideration in a variety of different settings, and particularly in crowded urban environments. While there are many benefits to living in a densely populated area, including energy efficiencies, quality of life for the residents can often be drastically improved by efficiently designing buildings and other structures to centralize a variety of different needs of the residents, including residential housing, work, education, entertainment, shopping, dining, recreation, etc. Doing so can decrease or eliminate long commute times, as well as facilitate greater opportunities for improved social interaction among the residents. These designs can further be enhanced by maximizing the usage of space and by providing conveyance systems within the space that provide residents an efficient method to travel throughout a building or structure, or between various locations.

Currently, to move or transport a human being between two places with a vehicle or transportation system, several tons of steel and plastic are required to manufacture the cars, busses, trains, and individualized transports often used in urban environments. These various vehicles must also utilize various roadways formed from pavement, asphalt, concrete, etc. On an environmental level, this type of transportation is wasteful, dangerous, and dirty, as each vehicle emits pollution and other undesirable byproducts.

As an improvement over these transportation techniques, moving walkways are used in many commercial environments, such as airports. Moving walkways generally have a single belt, often formed with numerous distinct components, which operate at a single speed to transport human beings. These walkways may also be known as moving sidewalks, walkalators, skywalks, travolators, travelators, and/or travellators. They are commonplace at airports and shopping malls with speeds equal or lower than 3 km/hour. Additionally, these walkways are always constant speed moving walkways (CMW). Because they only operate at a single speed, and that speed must be low enough to allow for human entry and exit from the walkway, their operation is too slow for anything more than simplistic transportation; thus, their utility is limited.

Thus, a heretofore unaddressed need exists in the industry to address the aforementioned deficiencies and inadequacies.

SUMMARY OF THE DISCLOSURE

Embodiments of the present disclosure provide a variable speed moving walkway system and related methods. Briefly described, in architecture, one embodiment of the system, among others, can be implemented as follows. A plurality of walkway modules are provided, each having at least one movable belt, wherein each of the plurality of walkway modules is positioned at least one of: immediately linearly adjacent or immediately laterally adjacent to another. The at least one movable belt of each walkway module of the plurality of walkway modules is moving at a different speed from the at least one movable belt of an immediately linearly adjacent and/or an immediately laterally adjacent walkway module.

The present disclosure can also be viewed as providing a variable speed moving walkway system. Briefly described, in architecture, one embodiment of the system, among others, can be implemented as follows. At least two walkway modules are provided, each having at least one belt moving at a different speed from that of a linearly adjacent walkway module. A transition system is positioned between the at least two walkway modules. The transition system has a T-shaped "stationary wedge" positioned between at least one belt of each walkway module and at least one rotational brush or fixed rubber positioned in a gap formed between the stationary wedge and the at least one belt of each walkway module.

The present disclosure can also be viewed as providing a variable speed moving walkway system. Briefly described, in architecture, one embodiment of the system, among others, can be implemented as follows. At least two walkway modules are provided, each having at least one belt moving at a different speed from that of a linearly adjacent walkway module. A transition T-bar is positioned between the at least two walkway modules. The transition T-bar has a riser positioned at least partially between at least two walkway modules and a horizontal plate connected to an elevated end of the riser, wherein the horizontal plate is positioned below a surface of the belt of each walkway module.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
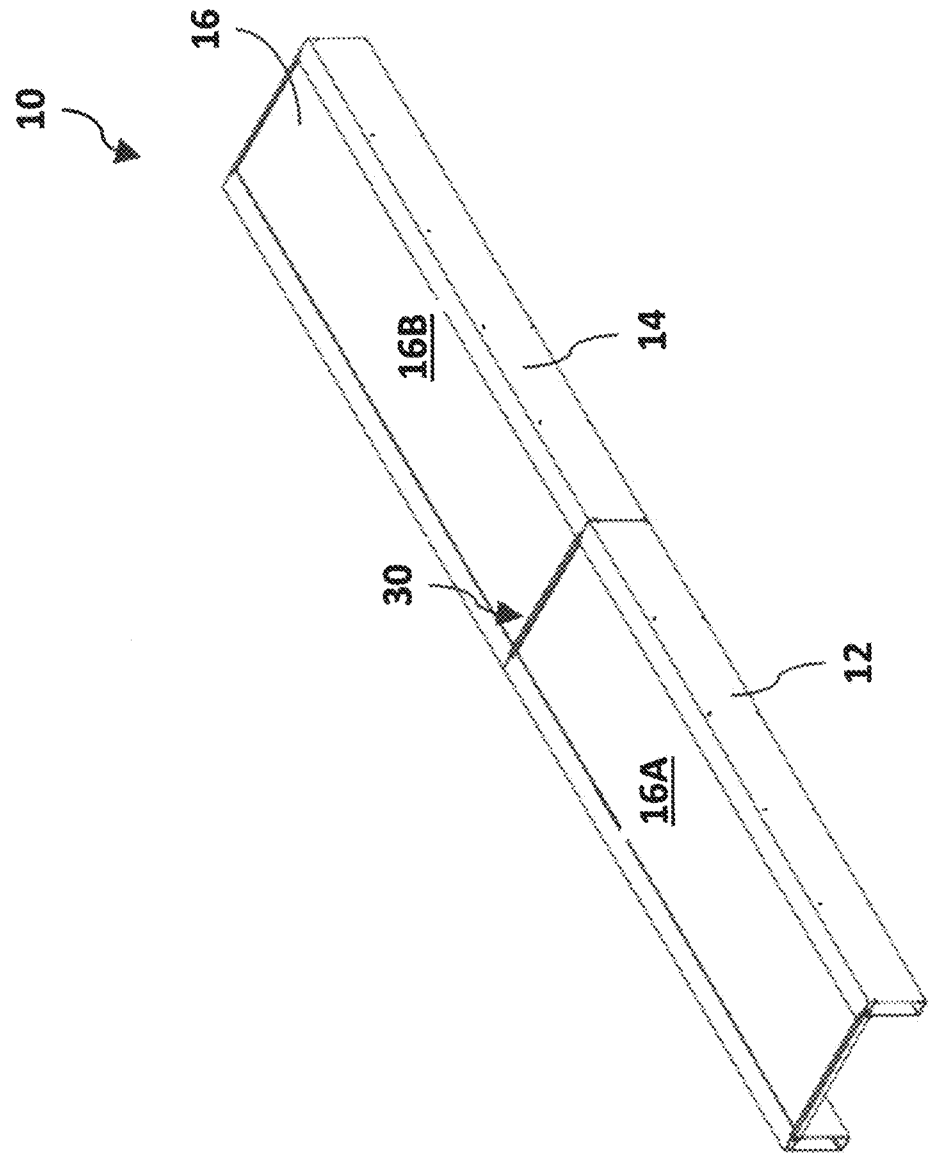
FIG. 1 is an illustration of the variable speed moving walkway system, in accordance with a first exemplary embodiment of the present disclosure.

The subject disclosure is directed to variable speed moving walkway systems and methods of using the same. FIG. 1 is an illustration of the variable speed moving walkway system 10, in accordance with a first exemplary embodiment of the present disclosure. The variable speed moving walkway system 10, which may be referred to herein as 'system 10' includes at least two walkway modules 12, 14, each having at least one belt 16 moving at a different speed from that of a linearly adjacent walkway module. Accordingly, a user may enter the system 10 on a first walkway with a belt 16A moving at a first speed and then transition to a second walkway with a belt 16B moving at a second, higher speed. When numerous walkway modules are used in concert, a human being can effectively be transported from one location to another by the system of walkways, some of which increase in velocity relative to adjacent walkways, and others which decrease in velocity relative to adjacent walkways. In this way, the system 10 provides variable moving walkway modules or accelerated moving walkways (AMW). To facilitate movement between two walkways, a transition system 30 is positioned between the at least two walkway modules 12, 14. The transition system 30, which is described in detail relative to FIGS. 2A-6B, may be a system for transitioning between the movement of a first belt 16A and the movement of a second belt 16B in two adjacent walkways 12, 14. The combination of the walkway modules 12, 14, each having at least one belt 16 moving at a different speed from an adjacent walkway, allows for the efficient transportation of human beings and other entities and/or objects such as bicyclists.

One of the most important distinctions of the system 10 is its modular structure. Thus, it may be called Accelerated Modular Moving Walkways (AMMW). Unlike other walkways, each module 12, 14 is a complete functioning unit on its own. Each module 12, 14, in several-meters length (preferably, but not necessarily, 4 meters) is a complete moving micro walkway itself. The modules 12, 14 may be lined up and interlocked, similar to Lego® pieces, and the speed of each motor may vary depending on the module's 12, 14 location on the system 10. It is possible to manufacture identical modules 12, 14 with motors of different powers, or to use the same size motor for every module 12, 14, and increase the speed and power electronically depending on the module's 12, 14 location on the walkway system 10. In one example, for every two modules 12, 14, there may be a transition cartridge (whose length may be almost equal to the width of the module 12, 14 and its width may be about 3 cm on top and 5 cm in the bottom), which may be inserted from the side of the walkway and slid in between two modules 12, 14, guided by drawer slides. Such a modular system may provide major advantages during manufacturing, construction/assembly, and maintenance.

In one example, it may be possible to install/assemble 1 km of modular walkways on a street, sidewalk or bridge in a single day or night. Each walkway system may have spare modules and spare transition cartridges located in the entrance and exit section, where they will be inactive. For instance, if module number 57, which moves in 25 km/h, is malfunctioning or showing signs of trouble, the electronic emergency system, which will be augmented by a special A1 programming, may gradually slow down each module, bringing them to halt. Simultaneously, the maintenance crew is informed, through their monitoring screens and cell phone apps, about the location and number of the troubled module. The small team may remove a spare module from either the entrance or exit, whichever is closer to them, and they may place the module on a portable four small wheels (which may be available on the site, hanging vertically and elegantly from the external wall) and they may move the spare module to the location of the malfunctioning module. They may unlock the connection and pull the transition cartridge out and then pull the malfunctioning module out and replace it with the spare module, and if needed with the spare cartridge. The replacement of the walkway module and/or transition cartridge should take less than 5 minutes, excluding the time for the crew to reach the point and move the spare module to the location. The time spent for transportation could be reduced to several minutes through special training and strategically located small monitoring/logistic offices with two crew members nearby. This may reduce dramatically the cost of transportation, the time of construction/assembly, and the time and cost of maintenance.

The system 10 described herein allows efficient mass transportation of people 2 to 10 times even faster than walkways at airports with insignificant amount of carbon emission, virtually zero traffic jam and accidents, and zero parking problems. With the adoption of the modified old technology, cities utilizing the system 10 will reduce pollution through the usage of solar or electric energy. Moreover, use of the system 10 can prevent traffic jams, largely eliminate the need for traffic signs, lessen automobile parking problems, and drastically lessen fatal traffic accidents. They will also allow for a more cost-effective mode of transportation since individuals would not need to invest in automobiles, and municipalities would not need to invest in busses, trams, or trains. Because of this reduction, it is also possible to reduce the negative environmental impact of human transportation. From only a cost standpoint, if the system 10 is adopted in cities, it will reduce and ultimately may put an end to many of the inefficiencies and wastefulness of current human transportation. As an illustration of the possible cost savings, if driving cost a person $1, society pays $9.20; if bussing cost a person $1, society pays $1.50; if biking cost a person $1, society pays $0.08; if walking costs a person $1 society pays $0.01. The anticipated cost impact of the system 10 is somewhere between cost of bussing and biking.

In order to improve over the shortcomings of these devices, the system 10 disclosed herein considers various factors, including:

1. Acceleration and Speed: The commonly used CMW uses a speed between 0.6 m/s to 0.8 m/s. Though high entry speed affects its capacity by increasing the flow of passengers and decreases the travel time, high entry speed to accelerated walkways creates a feeling of discomfort. In addition to the acceleration and deceleration speed, the time spent by pedestrians on each accelerating or decelerating module is not calculated properly to reduce the discomfort created through forward and backward acceleration.
2. System: So far, four types of AMWs have been introduced: (a) in-line belts, (b) sliding parallelograms, (c) accelerating/decelerating rollers and (d) sliding pallets. Each system has advantages and disadvantages.
3. Tread: The belting material used to convey people on walkways has been clunky steel or heavy rubber. The design that used pallets that "intermesh" with a comb and slot arrangement is safe, yet it's complicated mechanism makes it inefficient and in need of constant repairs.
4. Transition: The head and tail pulleys at the two transfer ends of the conveyor create a big gap between the modules. With the replacement of pulley ends with nose-bar ends the distance is reduced significantly to about 3 cm; yet the gap continues to be the detail where the devil hides. The 3 cm gap is big enough to function as a trap for shoelaces and high heels. To close the gap various schemes have been tried.
5. Construction and Operation Cost: The cost of an AMW is much less than the cost of other public transportation systems, such as buses and metros. Especially the ones with in-belt system is way more inexpensive and modem innovations in material technology and AMMW's complete-modular design makes the cost of its manufacturing and installation, and maintenance affordable.
6. Usage: Moving walkways are used indoors.

Figure 2B:
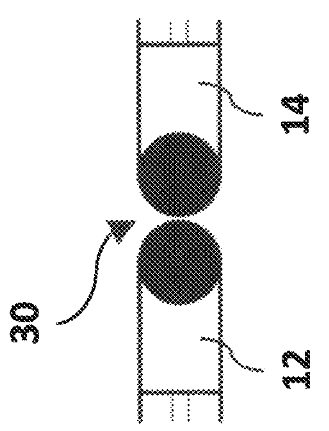
FIGS. 2A-2C are illustrations of the junction between two walkways of the variable speed moving walkway system, in accordance with the first exemplary embodiment of the present disclosure.
Figure 2A:
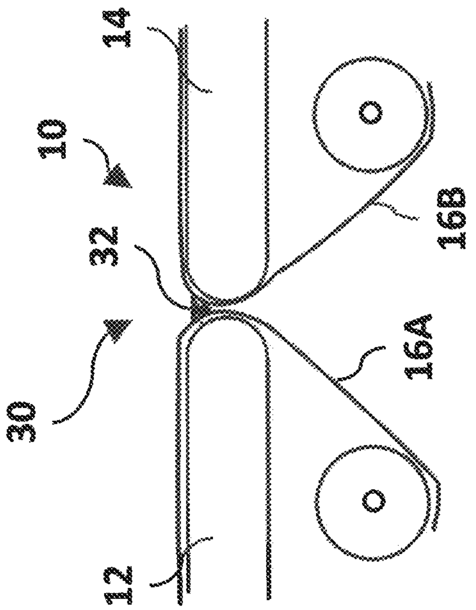
Figure 2C:
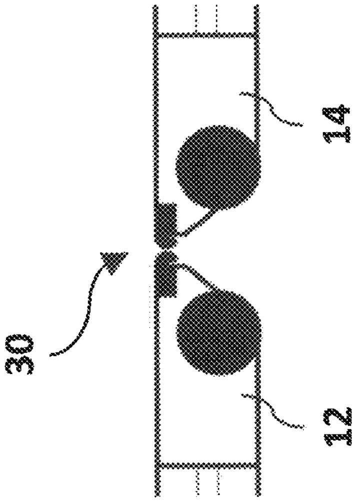

FIGS. 2A-2C are illustrations of the junction between two walkways of the variable speed moving walkway system 10, in accordance with the first exemplary embodiment of the present disclosure. The junction between two walkways 12, 14 may use the transition system 30 to ensure that riders of the system 10 do not experience issues when passing between two walkways 12, 14. The transition system 30 is positioned at least partially between the walkways 12, 14 and has an upper surface which is at the same level or a few millimeters lower than an upper surface of the belts 16A, 16B of each walkway 12, 14. As shown in FIG. 2B, the walkways 12, 14 may have a junction with belt rollers in both ends of the modules positioned proximate to each other. However, the radial dimension of the end rollers may be large and thus create a large distance between the planar surfaces of the belts 16A, 16B. In contrast, FIG. 2C illustrates a nose-bar junction where the belts 16A, 16B are positioned around smaller diameter bars positioned near the upper, planar surfaces of the belts 16A, 16B. In this design, the distance between the planar surfaces of the belts 16A, 16B is lessened substantially. It is desirable for the separated distance between least two walkway modules 12, 14 to be less than or equal to one inch, however other distances and dimensions are also envisioned depending on the design, all of which are included within the scope of the present disclosure.

Figure 3:
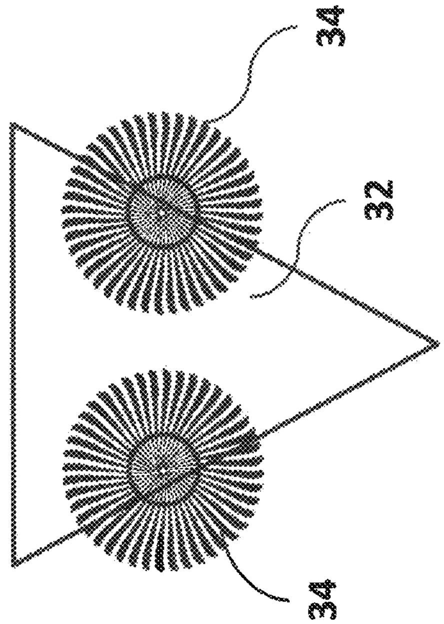
FIG. 3 is a diagrammatical illustration of the wedge and roller junction between two walkways of the variable speed moving walkway system, in accordance with the first exemplary embodiment of the present disclosure.
Figure 4:
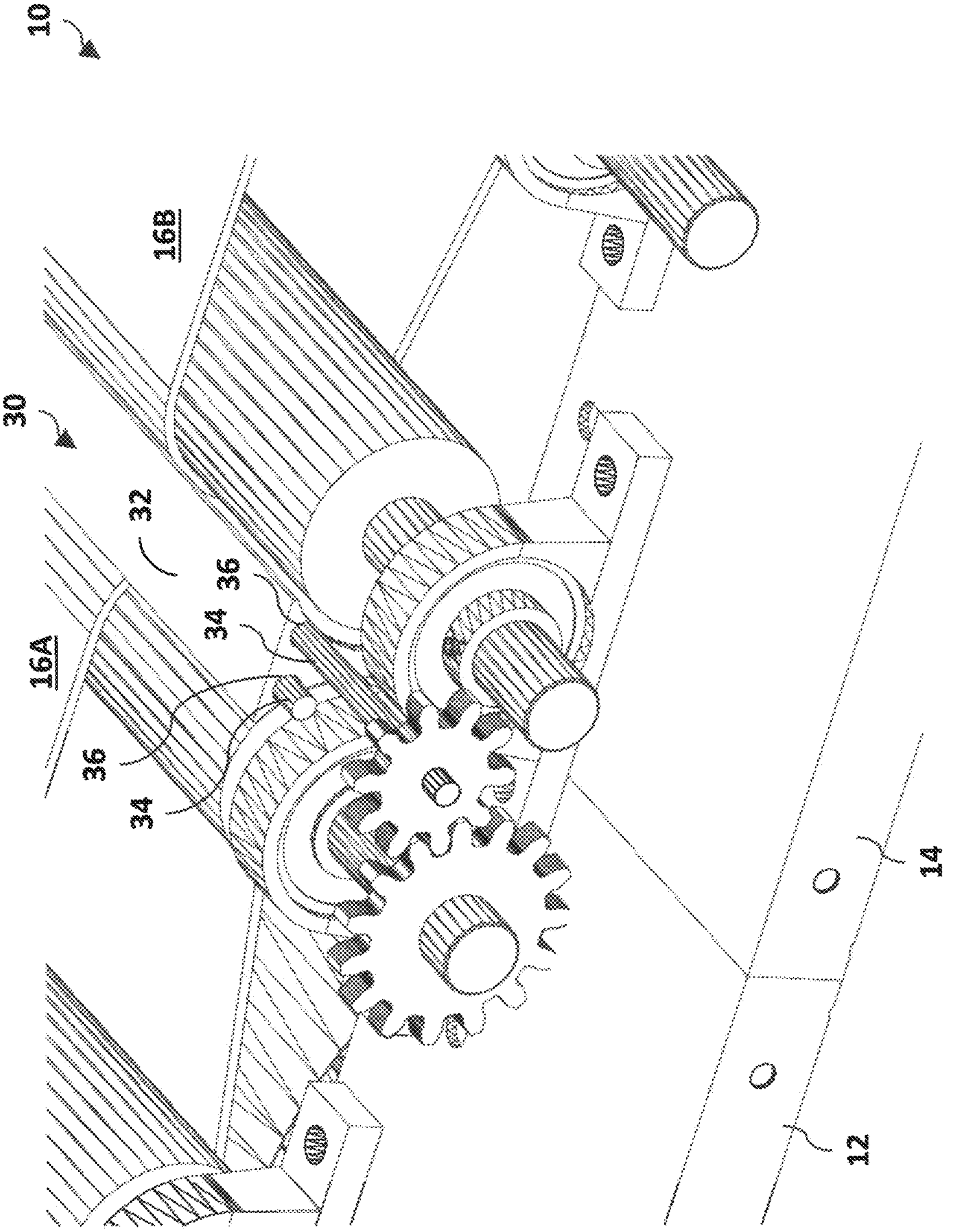
FIG. 4 is an illustration of the wedge and embedded air spray tube between two walkways of the variable speed moving walkway system, in accordance with the first exemplary embodiment of the present disclosure.

FIG. 3 is a diagrammatical illustration of the wedge and roller junction 32 between two walkways of the variable speed moving walkway system 10, in accordance with the first exemplary embodiment of the present disclosure. FIG. 4 is an illustration of the wedge and roller junction between two walkways of the variable speed moving walkway system 10, in accordance with the first exemplary embodiment of the present disclosure. The transition system 30 (FIG. 2A) in the junction may include a stationary wedge 32 positioned between the at least one belt of each walkway module. At least one rotational brush 34 may be position in a gap formed between the stationary wedge 32 and the at least one belt 16A, 16B of each walkway module 12, 14, respectively. The wedge 32 may act as a mechanical interface between the two belts 16A, 16B which prevents objects (such as shoelaces) from extending into the junction. The wedge 32 may be held in position between the belts with appropriate mechanical devices, as shown, with the upper surface of the stationary wedge 32 positioned proximate to an exposed surface of the belt of the at least two walkway modules, wherein the upper surface is positioned below the exposed surface of the at least one belt of the at least two walkway modules. The rotational brushes 34 may be positioned at least partially within a pocket 36 formed within the wedge 32, which permits only a radial portion of the rotational brush 34 to be exposed outside of the stationary wedge 32. Additionally, the rotational brushes 34 are rotatably moving along with the belts 16A, 16B, such that the portion of the rotational brush 34 which is exposed may slightly or almost contact the surface of the belt 16A, 16B, respectively, and prevent contaminants from moving into the junction. For instance, the rotation brush 34 may prevent shoelaces or other objects from getting caught in the junction. In one example, the rotational brush 34 may move in a rotational direction opposite to a direction of belt movement. Movement of the rotational brush 34 may be achieved through mechanical activation by a drive mechanism of the belt 16A, 16B of one or more of the walkway modules 12, 14. For instance, a drive wheel of the belt 16A, 16B may be mechanically connected to the rotational brush 34 through a series of gears or connections. It is noted that rotational distance of the rotational brush 34 should be at least as great as a rotational distance of an adjacent belt 16A, 16B, such that the rotational speed of the brush 34 substantially matches or exceeds the movement of the belt 16A, 16B around the drive wheel. Instead of rotating brushes, we may prefer using fixed rubberized scrapper bands similar to the silicone or rubber blades used in windshield wipers.

Figure 5A:
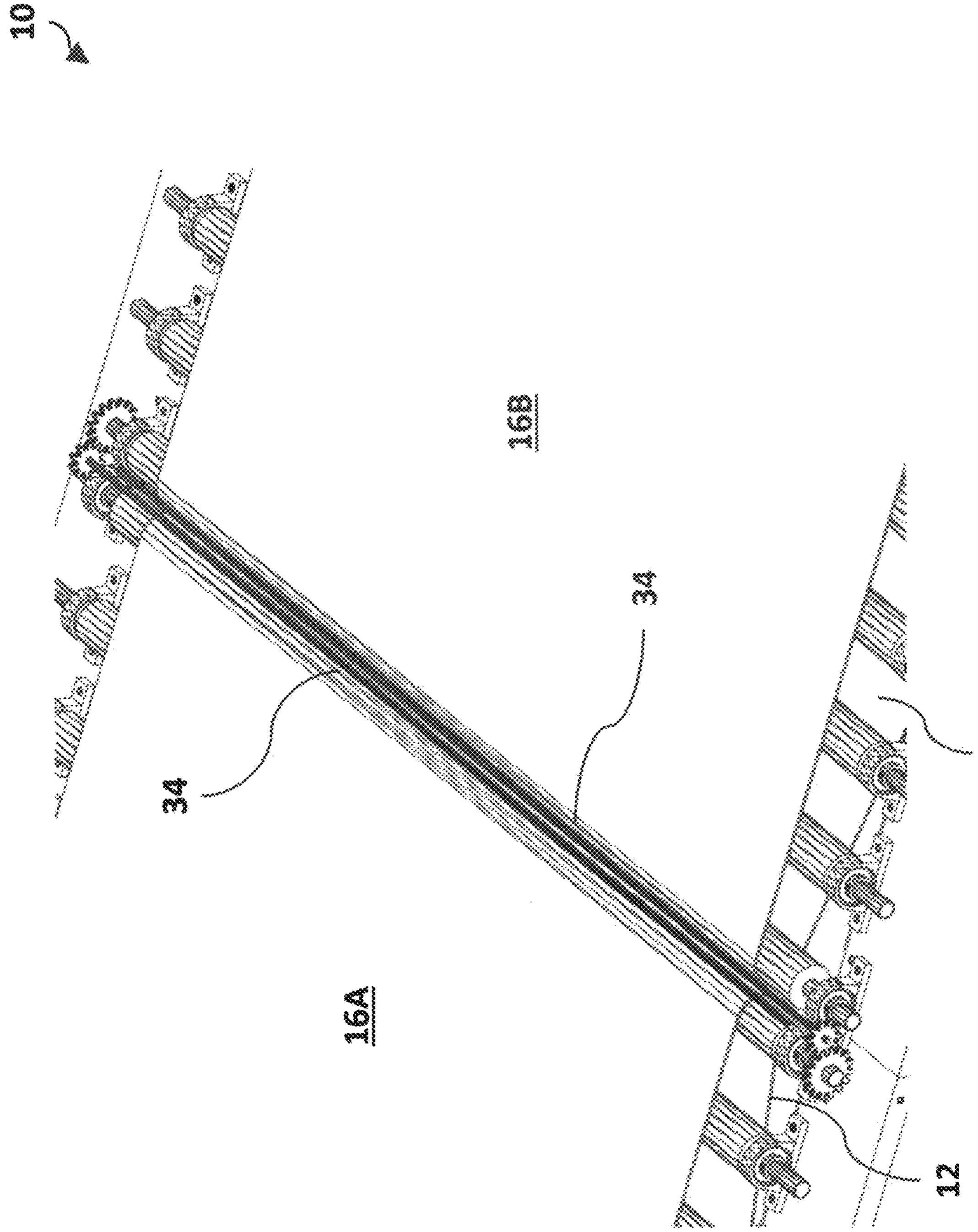
FIGS. 5A-5B are illustrations of the wedge and embedded air spray tube between two walkways of the variable speed moving walkway system, in accordance with the first exemplary embodiment of the present disclosure.
Figure 5B:
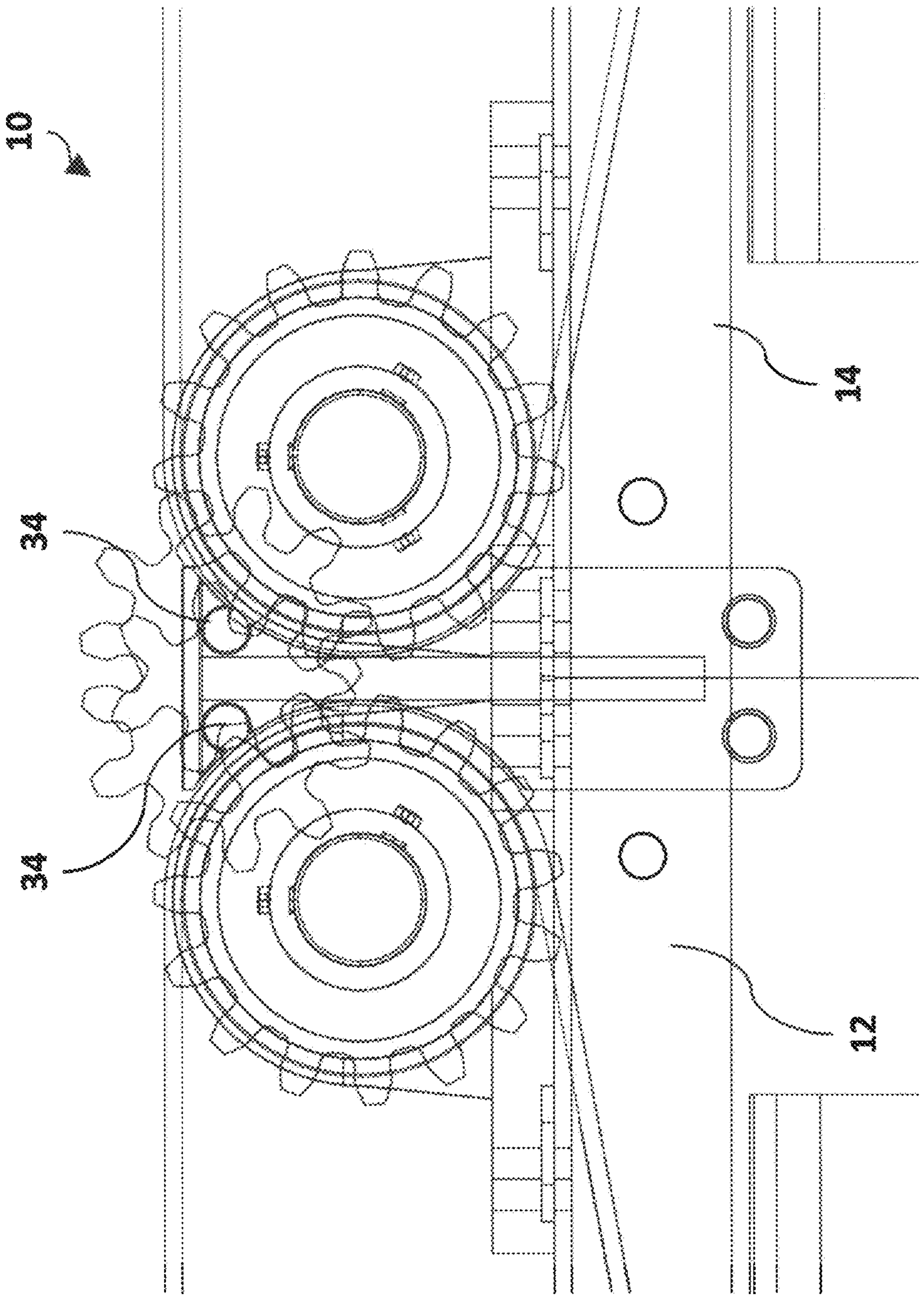

FIGS. 5A-5B are illustrations of the wedge and roller junction between two walkways of the variable speed moving walkway system 10, in accordance with the first exemplary embodiment of the present disclosure. In particular, FIG. 5A is a view of the junction between the walkways 12, 14 which depicts the roller brushes 34 without the presence of the wedge 32. FIG. 5B illustrates a partial cross-section view of the mechanical engagement of the rotational brushes 34 to the drive gears of the walkways 12, 14.

Figure 6A:
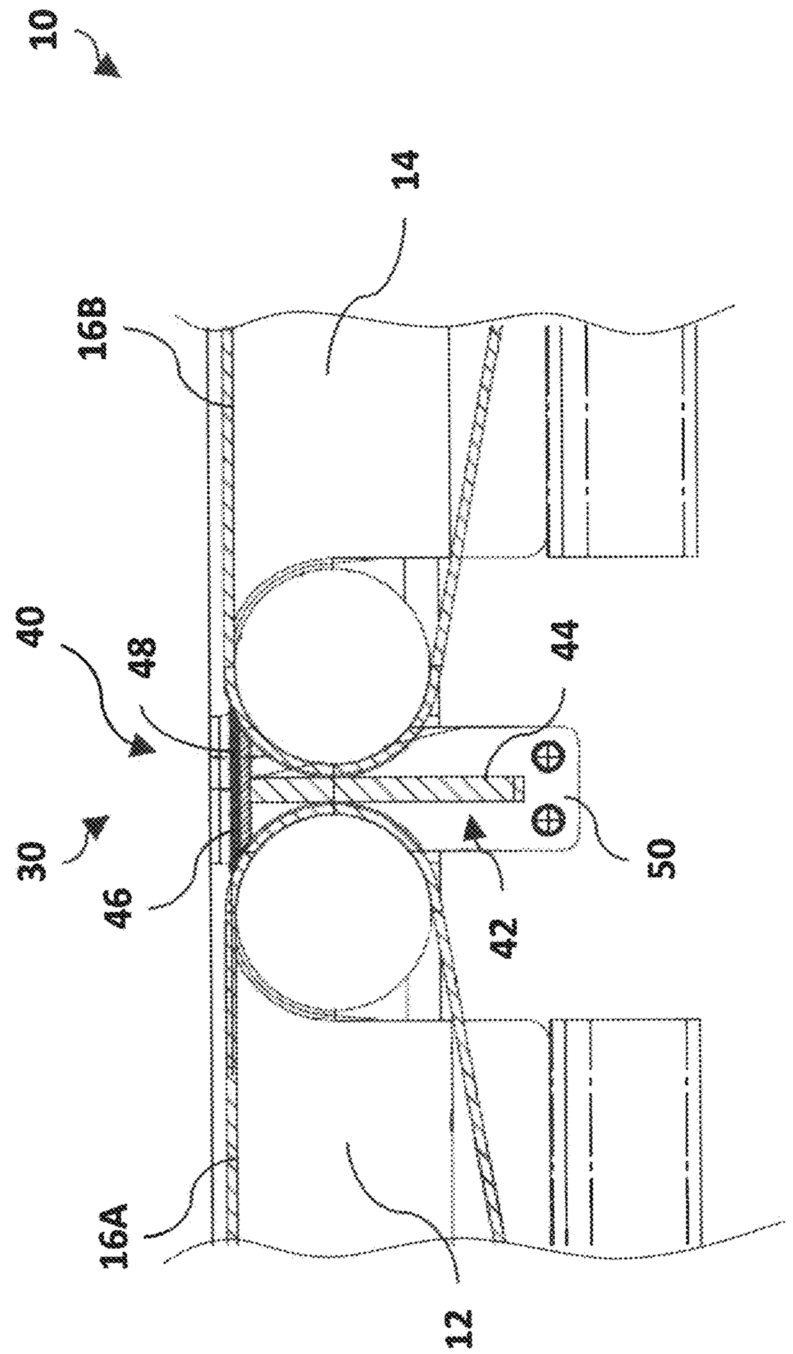
FIGS. 6A-6C are illustrations of a stationary transition device between two walkways of the variable speed moving walkway system, in accordance with the first exemplary embodiment of the present disclosure.
Figure 6B:
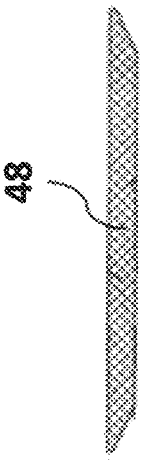
Figure 6C:
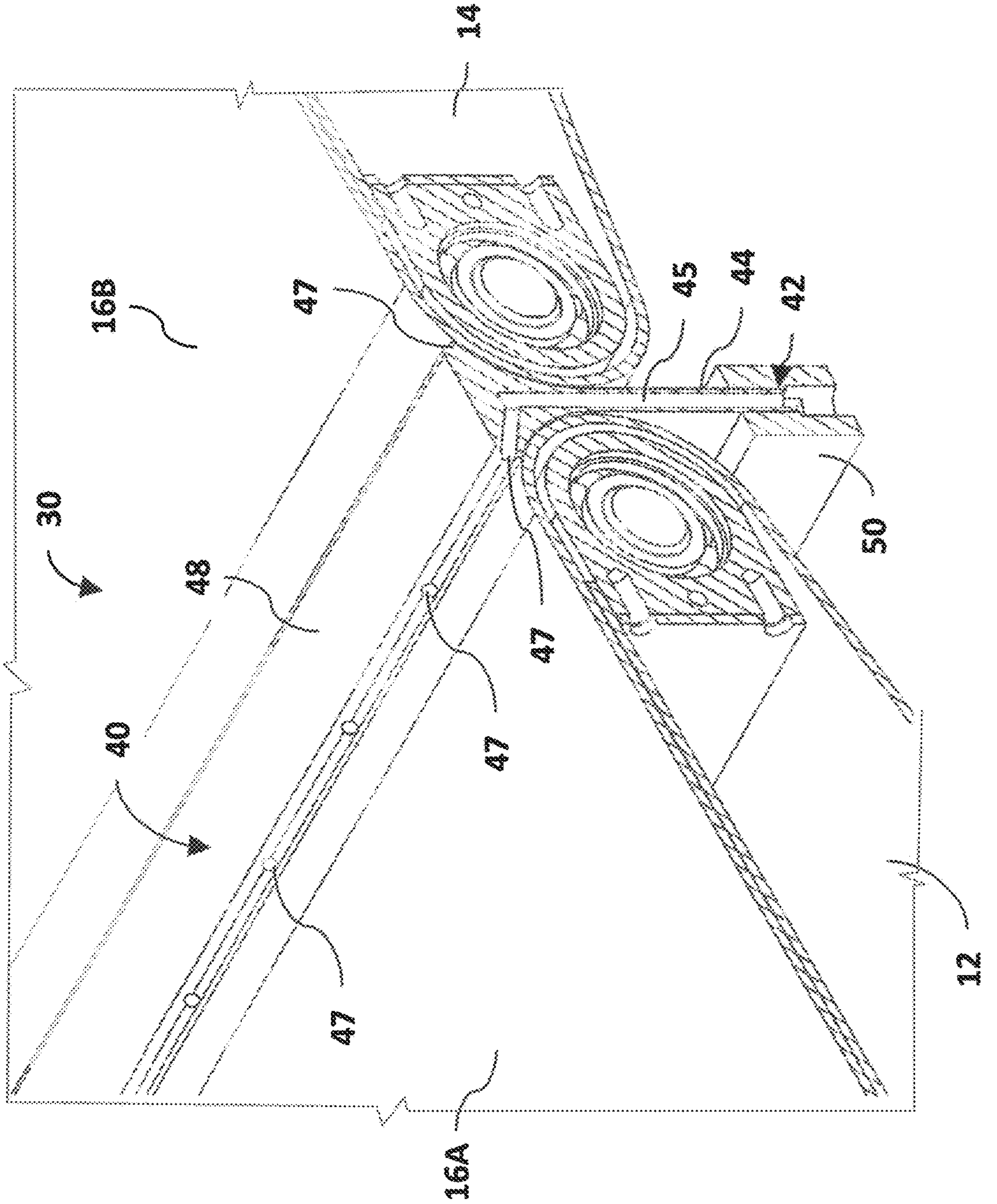

FIGS. 6A-6C are illustrations of a stationary transition device between two walkways of the variable speed moving walkway system 10, in accordance with the first exemplary embodiment of the present disclosure. As shown, the transition system 30 may include a stationary transition device 40, which has a transition T-bar 42 positioned between the at least two walkway modules 12, 14. The transition T-bar 42 has a riser 44 positioned at least partially between the at least two walkway modules 12, 14 and a horizontal plate 46 connected to an elevated end of the riser 44. The horizontal plate 46 is positioned below a surface of the belt 16A, 16B of each walkway module. The stationary transition system 40 may interface with the belts 16A, 16B through use of a rubberized scrapper band 48 positioned overlying an upper surface of the horizontal plate 46. FIG. 6B is a detailed illustration of the rubberized scrapper band 48. As can be seen, the rubberized scrapper band 48 wherein the rubberized scrapper band may have opposing beveled edges, which allows it to closely align with the surface contour of the belts 16A, 16B. The transition T-bar 42 may include a bracket 50 which is affixable to a wall positioned proximate to the at least two walkway modules. It is noted that an intermittent cleaning brush or cleaning device can be used to laterally sweep the junction to ensure it remains free of debris. Similarly, with either the stationary transition or the transition with rotational brushes, the junction may include a modification of air pressure to help blow any debris out of the junction. For example, FIG. 6C shows a transition system 30 having an air conduit 45 integrated within the riser 44. The air conduit 45 may be an open volume within the riser 44 to allow air to be blown through the riser 44 and at the surface of the belt 16A. A positive air pressure may be provided internal of the junction to create an outwards force through the junction which repels foreign matter therefrom. The air may be pumped out of the conduit 45 through one or more vents 47, which may have any suitable placement, number, shape, and size sufficient to keep debris out of the transition system 30. In one example, the vents 47 may be shaped to cover substantially the entire belt 16A with air flow. This is shown in greater detail in FIGS. 14A-14C, below. The air may also function as an air conditioner.

Figure 7A:
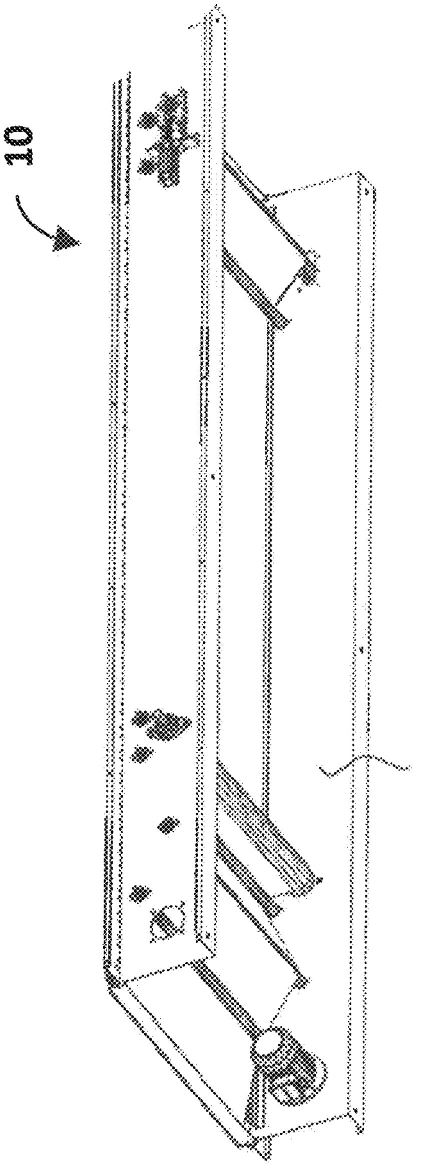
FIGS. 7A-7D are illustrations of multiple walkway modules of the variable speed moving walkway system, in accordance with the first exemplary embodiment of the present disclosure.
Figure 7B:
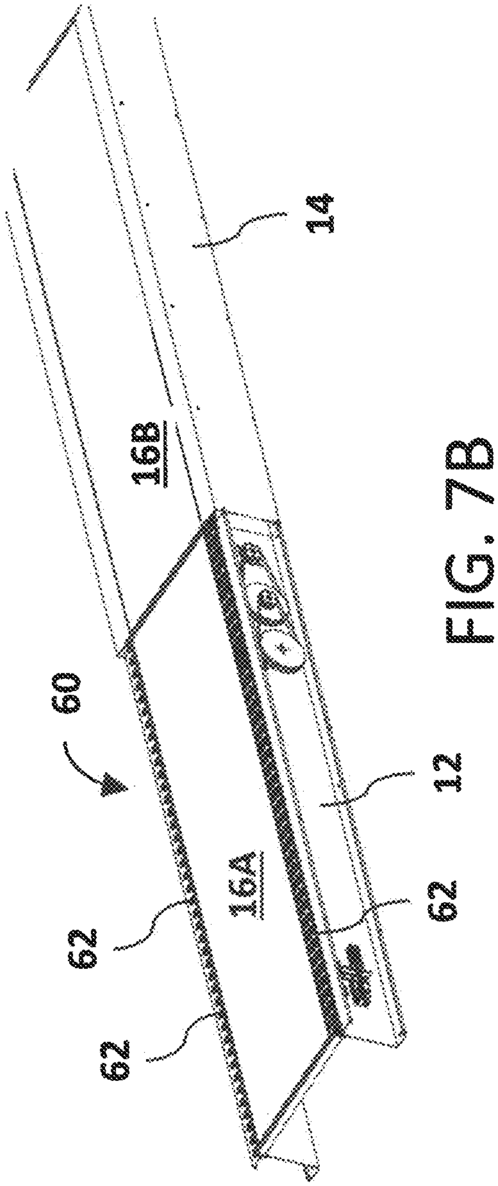
Figure 7D:
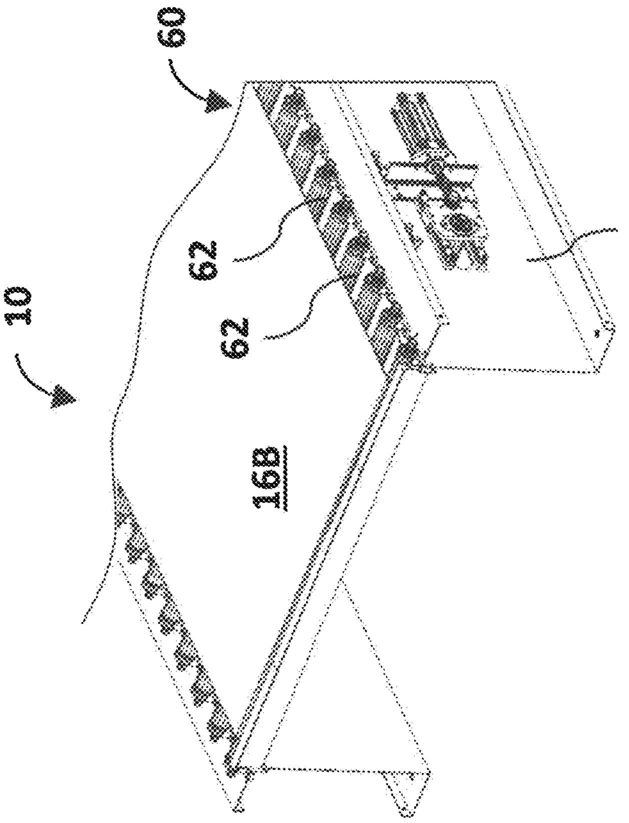
Figure 7C:
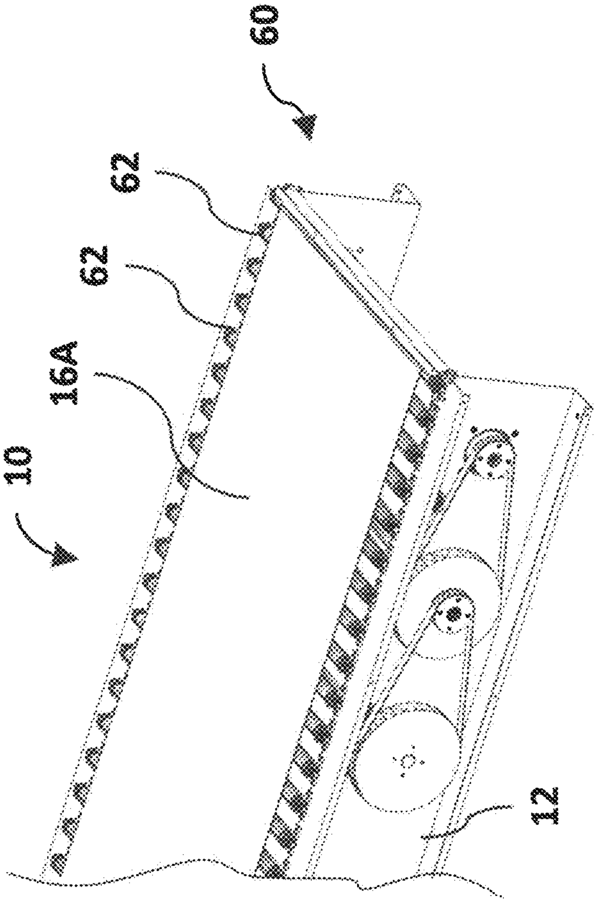
Figure 7E:
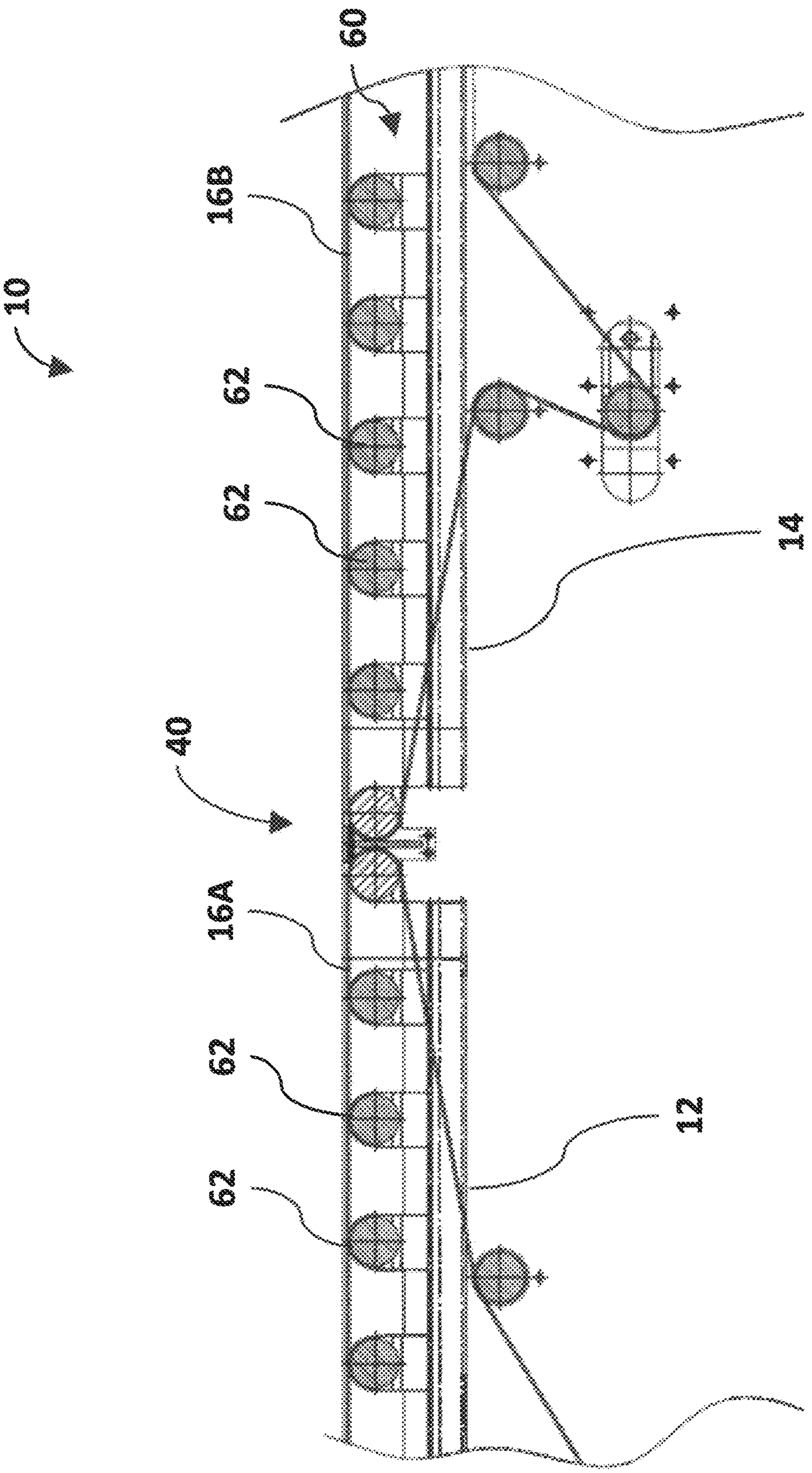
FIG. 7E illustrates the roller interface in use with walkways with the stationary transition device, in accordance with the first exemplary embodiment of the present disclosure.

FIGS. 7A-7D are illustrations of two modules of the variable speed moving walkway system 10, in accordance with the first exemplary embodiment of the present disclosure. In particular, FIGS. 7A-7D illustrate the walkways 12, 14 with a roller interface 60 positioned interior of the at least one belt 16A, 16B for each of the at least two walkway modules 12, 14. FIG. 7E illustrates the roller interface in use with walkways with the stationary transition device 40. The roller interface 60 has a plurality of rotatable rollers 62, wherein the at least one belt 16A, 16B moves on at least a portion of the plurality of rotatable rollers 62. In use, the belt 16A, 16B moves over the rollers 62 to allow for eased movement of the belt 16A, 16B. The rollers 62 may be spaced any desired distance apart and they may include features and textures to provide the desired friction to the belt 16A, 16B.

Figure 8B:
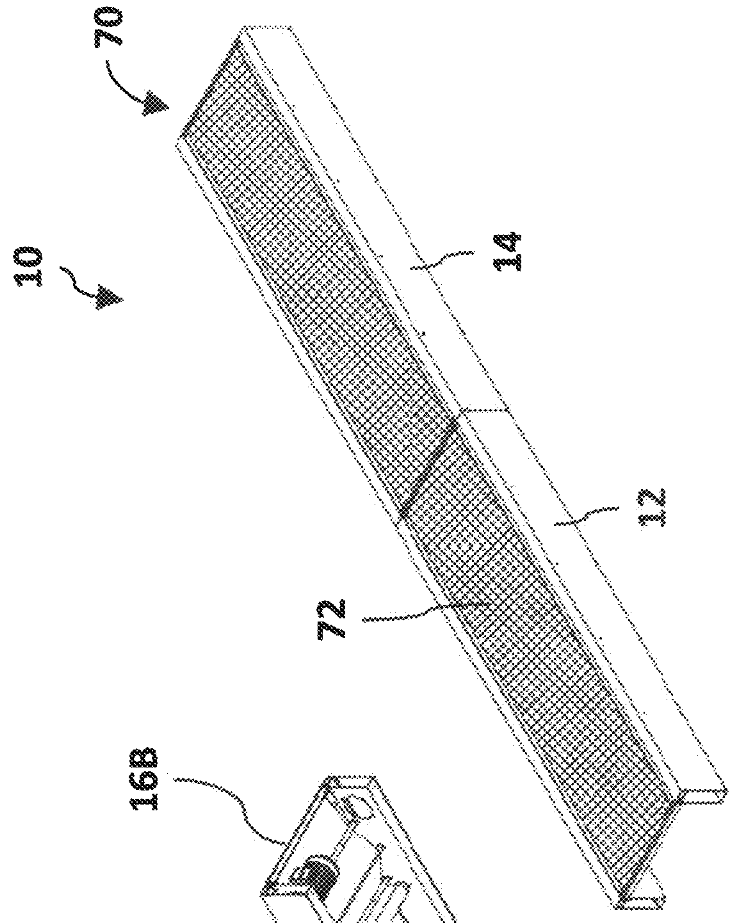
FIGS. 8A-8B are illustrations of two walkway modules of the variable speed moving walkway system 10, in accordance with the first exemplary embodiment of the present disclosure.
Figure 8A:
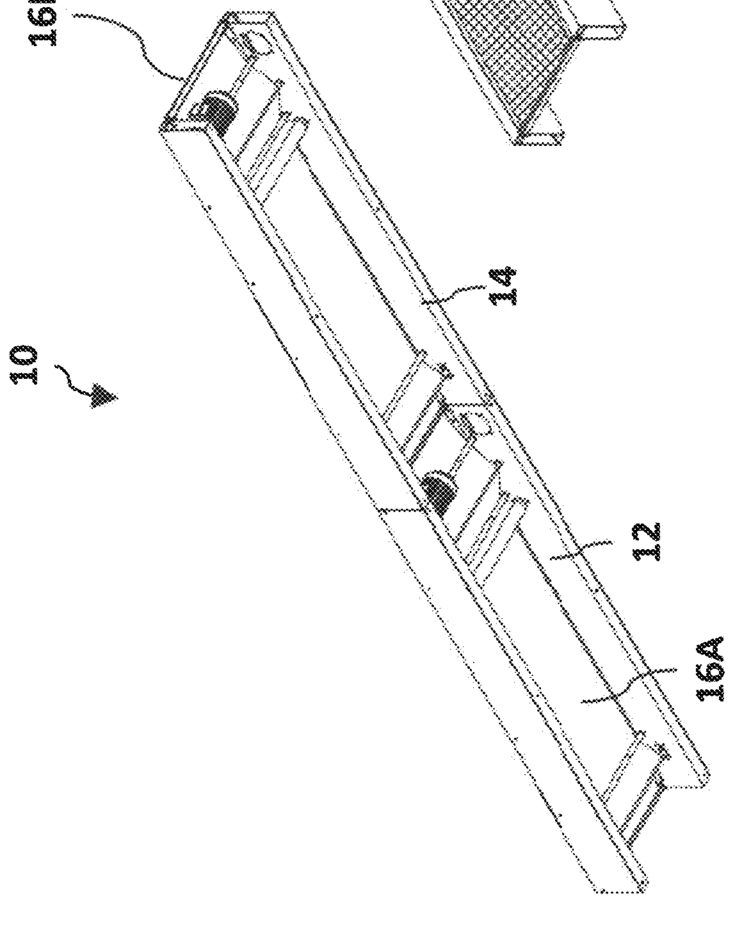

FIGS. 8A-8B are illustrations of two modules of the variable speed moving walkway system 10, in accordance with the first exemplary embodiment of the present disclosure. In particular, FIGS. 8A-8B illustrate the system 10 with a stationary, low-friction belt interface 70 which includes a substantially planar surface 72 formed from a low-friction material. FIG. 8B illustrates the substantially planar surface 72 exposed, without a belt, whereas FIG. 8A illustrates the system 10 with belts 16A, 16B. The low-friction material may include a variety of materials or combinations thereof, such as at least one of: polytetrafluoroethene (PTFE), commonly known under the tradename TEFLON®, stainless steel, a metallic compound, and/or a plastic. In one example, flat metal plates coated with PTFE may be used. The substantially planar surface 72 may be rigidly connected to a frame of the walkways 12, 14, such that the belt 16A, 16B can slide over the surface thereof with minimal resistance. The substantially planar surface 72 may be durable enough to carry the weight of any users of the walkways 12, 14. The in-line belt system may be the best mechanism since it is the simplest and most efficient and is already used in conveyor belts and treadmills. Moving a belt with low friction coefficient over idling bars works well, but instead of using idling bars, moving the belt over flat metal plates coated with PTFE, the plastic with the lowest coefficient of friction, may produce the best result.

Figure 9:
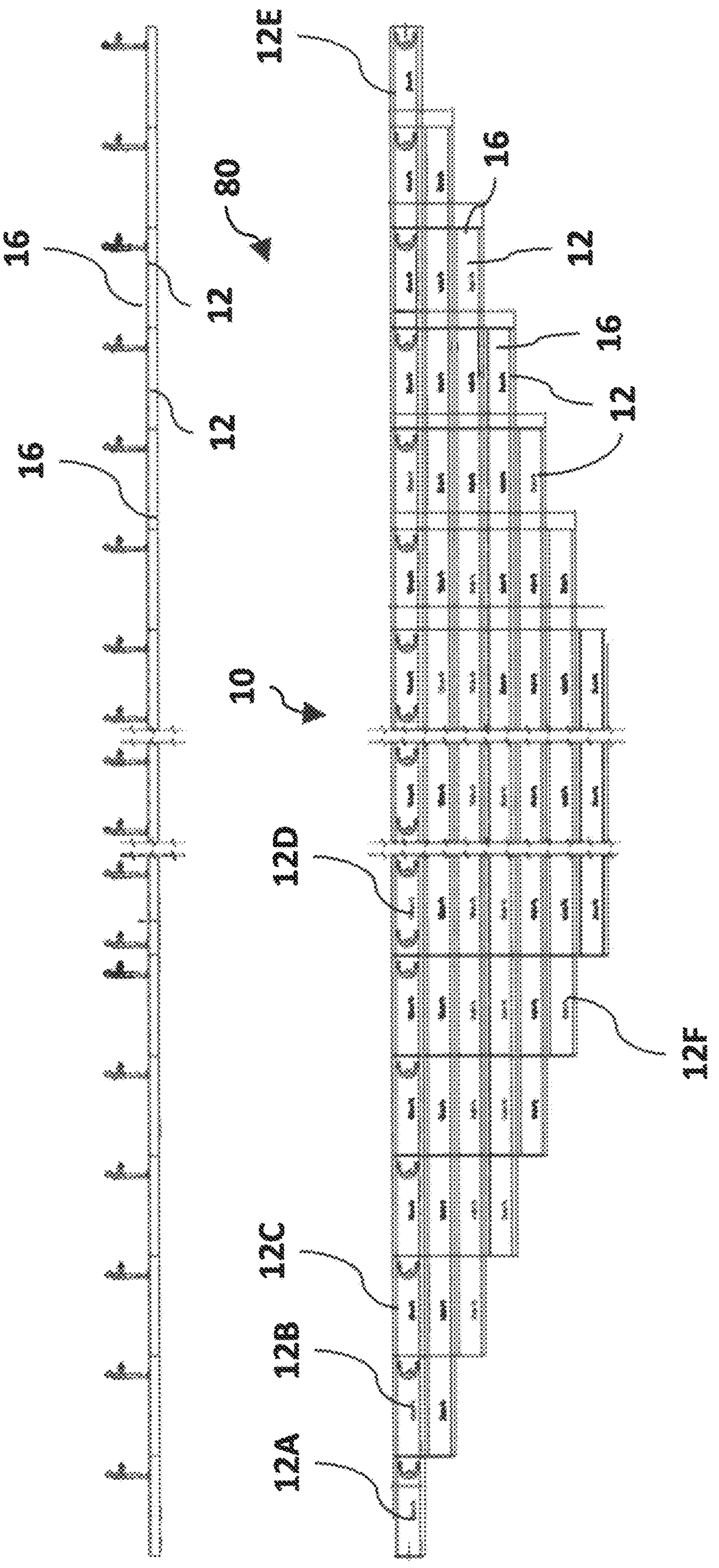
FIGS. 9-10 are illustrations of the variable speed moving walkway system, in accordance with the first exemplary embodiment of the present disclosure.
Figure 10:
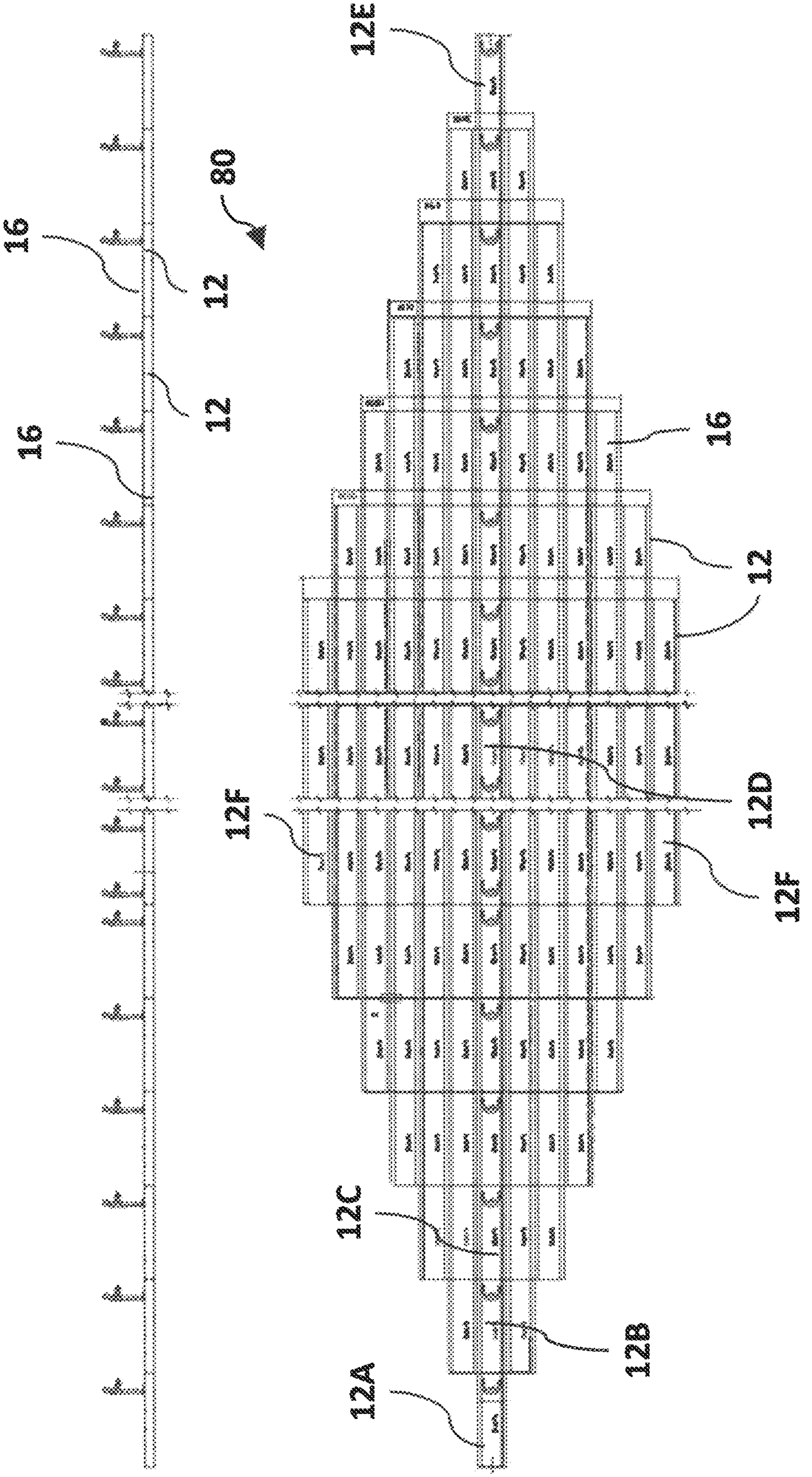

FIGS. 9-10 are illustrations of the variable speed moving walkway system 10, in accordance with the first exemplary embodiment of the present disclosure. As shown, the system 10 includes a plurality of walkway modules 12, each having at least one movable belt 16. Each of the plurality of walkway modules 12 are positioned either immediately linearly adjacent to another walkway module 12, or immediately laterally adjacent to another walkway module 12, or both immediately linearly adjacent and immediately laterally adjacent to another walkway module 12. A sequence of the walkway modules 12 can be arranged to form an array of walkways 80. Each walkway 12 has a belt speed which is a different speed from an adjacent walkway 12, either immediately linearly adjacent, or an immediately laterally adjacent, or both immediately linearly adjacent and an immediately laterally adjacent. In accordance with this disclosure, immediately adjacent may be construed to mean walkways which are positioned directly adjacent or next to one another, either linearly (along the belt-moving direction) or laterally (perpendicular to the direction of the belt movement).

When an array 80 of walkways 12 is formed, the speeds or velocities of the belts for each walkway 12 may be arranged to increase from an exterior edge of the array, e.g., along the outer side of the array, to an interior of the array 80. The speeds of each belt may be selected depending on design of the system 10, however, for clarity in disclosure, a 2 km/hr incremental speed is used between parallel walkway lanes. For example, in FIG. 9, a first walkway 12A may have a speed of 2 km/hr since it is where users may enter the array 80. The next walkway 12B may have a speed of 4 km/hr, and the next walkway 12C may have a speed of 6 km/hr, and so on until a top speed of the array is reached at walkway 12D. After any desired length or number of walkways at the top speed, the sequence of walkways may decrease in speed, until the ending walkway 12E has a speed of 2 km/hr. With this accelerated walkway array, a user can enter the array 80 at a safe speed, e.g., 2 km/hr and incrementally achieve faster speeds by moving between the walkway modules. When the user desires to exit the array 80, he or she may sequentially lower their speed through the walkway modules until they can safely exit to the ground surface.

While this description is illustrated in FIG. 9 in a linear manner, it is noted that a lateral increase or decrease of speed can also be used. For example, a user can enter the array at walkway 12F at 2 km/hr and increase their speed by moving towards the middle of the array, e.g., at walkway 12D. The user can then exit the array 80 at any of the walkways along the edge of the array 80, all of which would have belt speeds of 2 km/hr. FIG. 10 illustrates a similar design to that of FIG. 9, but in FIG. 10, the array is fully surrounded by the lowest speed walkways, whereas in FIG. 9, the array 80 is illustrated having a linear path of the array abutting a wall or similar feature (such that users could not enter the array 80 at walkways 12B, 12C, 12D, or any walkways in between). Different patterns of arrays can be assembled based on the setting or configuration of the layout in which the system 10 is to be implemented. It may be desired to vary the length of the modules depending on their belt speed, such that a user can spend an equal amount of time on each walkway regardless of the speed. For example, the 2 km/hr belted walkway may be 10 meters in length, whereas the 4 km/hr belted walkway may be 20 meters in length. Moreover, it is noted that the system 10 can also be designed for use with non-walking transport, such as with bicycles or other devices. In the case of bicycles, it may be desired to increase the speed, or increase the length of the walkway. Additionally, a number of variations and features can also be used. For instance, different colored LED lighting may be used to indicate the speed of the walkways.

The moving walkways of the present disclosure may be powered by a conventional supply of electricity or may alternatively run on other power supplies, such as solar power. The moving walkways may operate via motorized conveyer belts, for example, such as those found in treadmills and the like. The walking surfaces may comprise any durable material such as rubber or metal. Handrails or other supports may be positioned continuously or at various points along the escalator or moving walkway.

With particular reference to the acceleration and speed of the belts used in the walkways and/or walkway array, it is desirable to have comfortable acceleration and deceleration. To eliminate the discomfort due to the jerky movement caused by positive and negative acceleration, the increments of acceleration/deceleration (a/d) between modules should be kept around 0.2 m/s^2, which is 6.5 times slower than average walking speed of 1.30 m/s. (The European standards in 2010 set the maximum acceleration to 1 m/s^2. See: EN 115-2:2010 Safety of Escalators and Moving Walks, Technical Report, European Commission). Though higher constant speed can be achieved with no additional discomfort, because of safety concerns, European Union prescribes a maximum speed of 4.57 m/s, which is 16.45 km/h. This is a cautious limitation and with the usage of AMW technology it can reach higher speeds, since when the constant speed of the middle module is achieved, it is stable.

So, the speed and length of each A/D) module necessary to reach the maximum speed of 16 km/h will increase in increments of 0.2 m/s or 0.8 km/hr and the length should be calculated to provide 2 seconds for each a/d module.

Moreover, a rainbow color coding may be added not only to make the experience joyful, but also to guide the pedestrians and visually inform them about the speed of each module or segment. The wavelength of each color matches the comparative speed and length of the module. This coloring scheme is intended to subliminally and automatically guide their gait, posture and step, thereby comforting people psychologically and preparing them physiologically.

Below is the speed and length of each a/d segment (consisting of modules) of a straight AMMW with 1 km-length. As you will notice, the speed profile is symmetric, such that the length of acceleration section is the same of the deceleration section. For the sake of demonstration, we are limiting the distance to less than 50 meters. (A for acceleration, D for deceleration, C for constant; A1 is the first accelerating module. D1 is the last decelerating module).

| Segment | Speed (m/s) | Speed (km/h) | Length (m) | Cumulative distance (m) |
|---|---|---|---|---|
| A1 | 0.56 | 2 | 1.1 | 1.1 |
| A2 | 0.78 | 2.8 | 1.6 | 2.7 |
| A3 | 1 | 3.6 | 2 | 4.7 |
| A4 | 1.22 | 4.4 | 2.4 | 7.1 |
| A5 | 1.44 | 5.2 | 2.9 | 10 |
| A6 | 1.67 | 6 | 3.3 | 13.3 |
| A7 | 1.89 | 6.8 | 3.8 | 17.1 |
| A8 | 2.11 | 7.6 | 4.2 | 21.3 |
| C | 2.33 | 8.4 | 4.7 | 26 |
| D8 | 2.11 | 7.6 | 4.2 | 30.2 |
| D7 | 1.89 | 6.8 | 3.8 | 34 |
| D6 | 1.67 | 6 | 3.3 | 37.3 |
| D5 | 1.44 | 5.2 | 2.9 | 40.2 |
| D4 | 1.22 | 4.4 | 2.4 | 42.6 |
| D3 | 1 | 3.6 | 2 | 44.6 |
| D2 | 0.78 | 2.8 | 1.6 | 46.2 |
| D1 | 0.56 | 2 | 1.1 | 47.3 |

While accelerating, the passenger moves 26 meters in 8 segments, each taking 2 seconds, totaling 16 seconds to reach the speed of 2.33 m/s or 8.4 km/h. It will be the same for deceleration.

The optimum width of walkways may be 120 cm, since it allows people to pass each other without touching. Ideal material for Walking Belt (human conveyor) must have the following qualities:

- Has a very high tensile strength, such as with a material like aramid fibers.
- Has good throughability and curvability. Has a smaller pulley bending radius since about half of conveyor belt's driving energy is lost in indentation rolling resistance of the belt. A modified aramid-based rubber ingredient, such as Sulfron, reduces hysteresis of the rubber belt.
- Has thin carcass.
- Has less rolling resistance. Hysteresis is the main cause of energy loss associated with rolling resistance and is attributed to the viscoelastic characteristics of the rubber.

Tensile strength is resistance of a material to breaking under tension. It is the capacity to bear the weight of extreme loads. Spider silk has 1000 ultimate tensile strength (MPa) and 1.3 density (g/cm3). Carbon fibers UTS ranges from 1600 to 4137 with density of 1.79. Carbon fiber (Toray T1100G) is the strongest man-made fiber with minimum 7000 UTS and 1.75 density, but it is both expensive and highly controlled material since it is used in the making of nuclear weapons. Aramid fibers (such as Kevlar and Twaron) are among the materials with highest tensile strength. Aramid fibers has 3620 yield strength (MPa), 3757 UTS (MPa), and 1.44 density (g/cm^3). Another man-made material is Polybenzoxazole (Zylon) has 2700 yield strength, 5800 UTS and 1.56 density.

Aromatic polyamide, shortly known as aramid fibers, has the four desirable qualities we listed above, and it is so far the best material to be used as the moving belt for the system. With regard to the transition or junction between walkways, it is desirable for it to be safe and comfortable. The challenge is to reduce the gap and close it with a safe mechanism so that it will not let small objects, shoelaces and high heels get caught. By placing driving and tail pulleys and idlers below the turning points and using nose-head in transition points we can reduce the curving radius and thereby reduce the width of the gap between sections to less than 3 cm. Cross-sectionally mushroom-shaped or T-shaped metal bars is placed to fill the 120×3 cm gap between the two modules. They are extended between the balustrades at tread level. To prevent tripping and smooth transition, the top of the bar is slightly curved, and to prevent slipping, it may be placed about 2-3 mm below the level of threads of adjacent modules. To further reduce the gap on both sides of the T-shaped bars we place circular rubber bars. (Imagine the shape of a 120 cm long pencil). The rubber bars are either fixed or rotating. In rotating version, the rotation of the rubber bars is to the opposite direction of the belt, yet with the same speed. The synchrony is achieved by physically connecting to the idling bars under the tread by a simple gear system. To improve the safety further against objects such as shoelaces, compressed air is sprayed upward with high pressure through embedded tubes or through the remaining 2 mm gaps between the T-shaped metal bar and the belts of two modules. A small brush of 4 cm wide, could be housed on the side of a balustrade and placed over the T-shaped bar with magnet, and it could move over the T-shaped bar periodically or after the censors activate it upon need, pushing accumulated dirt to a small can placed at the opposing side. This automated cleaning will be done when people are not using the walkway. To guide people to move from one module to the next more comfortably, light or paint could be used to create the illusion of small 3-D bumps at transition lines.

With regards to access of the walkways or the array, in addition to longitudinal access, lateral access can be achieved with a system of parallel walkways with incrementally increasing and decreasing speeds leading to and away from the fastest walkway in their middle.

With regards to construction and operational costs, the construction of AMMW system may be much less costly than the CMW currently used at airports, since the system is more like a sophisticated conveyer belt or treadmill with multiple modules attached to each other. By using portable, say 4-meter long modules, and assembling them on the pavement or on the street asphalt like Lego® or puzzle pieces is one of the advantages of this invention. Solar energy could be used as supplement. These and many other parameters, will reduce the cost of manufacturing, installation and operation. The bottom section that houses the pulleys and motor will be about 30 cm high. A 1-meter ramp with 19 degrees angle will connect the street to the system. Access to the section will be from side doors. Parts will be easily inspected, and defective or old parts will be changed by pulling them out and replacing them with the newer ones.

With regards to usage, the system can replace longer walkways at airports, but its optimal use may be on the streets and highways. For instance, a 5 km tube containing walkway can help bicyclists commute to and from city centers.

Figure 11:
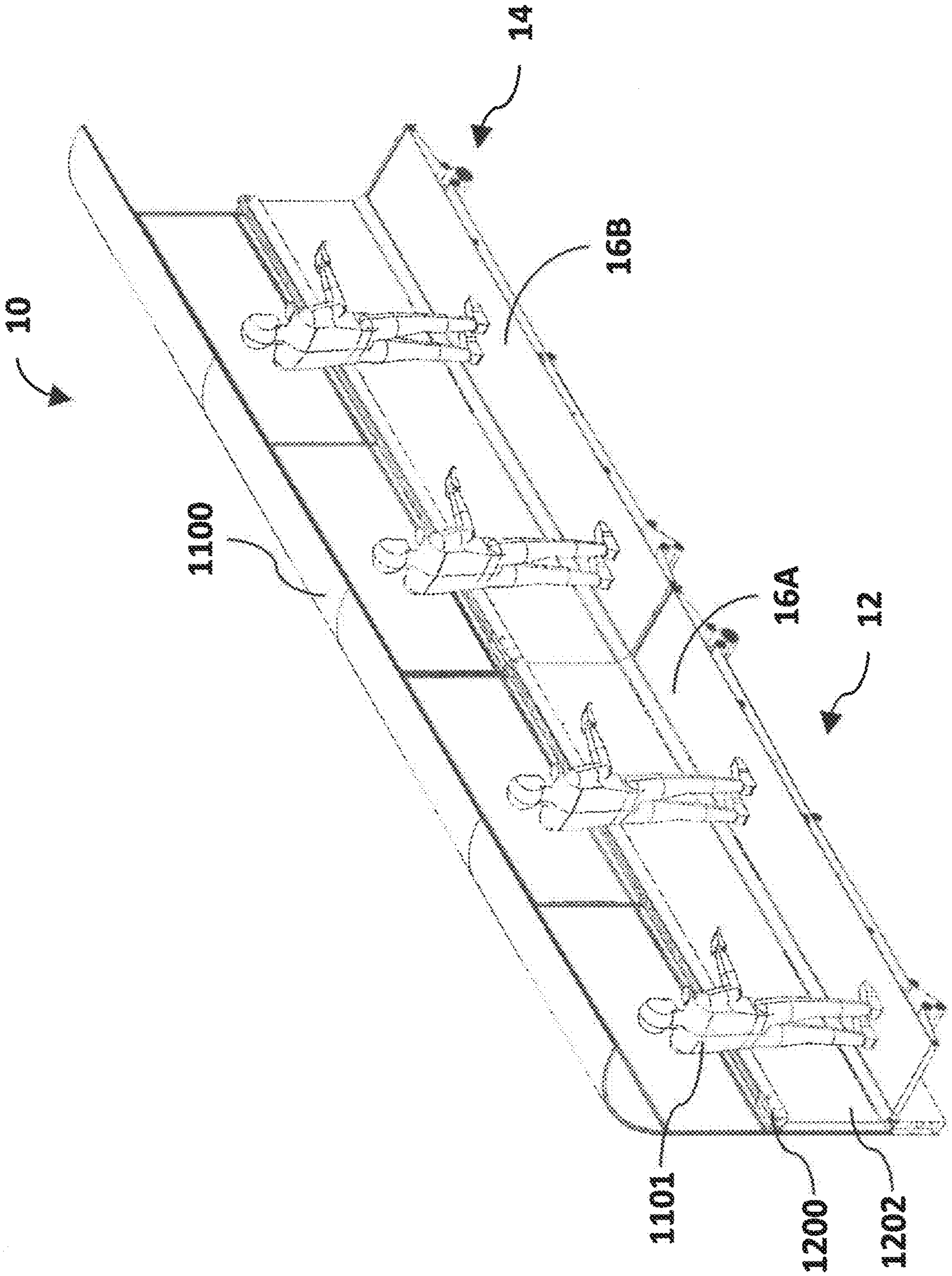
FIG. 11 is an illustration of passengers riding a variable speed moving walkway system having a handrail and a shade, in accordance with the first exemplary embodiment of the present disclosure.

FIG. 11 is an illustration of passengers 1101 riding a variable speed moving walkway system 10 having a handrail 1200 and a shade 1100, in accordance with the first exemplary embodiment of the present disclosure. The passengers 1101 may be standing (stationary relative to the belts 16A, 16B) or walking. The variable speed moving walkway system 10 may include walkway modules 12, 14 having belts 16A, 16B, as shown in FIGS. 1-10 above. In one example, the system 10 may include a handrail 1200 along the walkway modules 12, 14. The handrail 1200 may be located along at least a portion of the modules 12, 14. For instance, the handrail 1200 may be located in areas where passengers 1101 would benefit from increased stability, such as where the speed of the successive walkway modules 12, 14 is increasing. In another example, the handrail 1200 may be located along a particular module, such as module 12F within the array of walkways 80 shown in FIG. 10. In another example, walkway modules 12, 14 in certain locations—such as where young or elderly passengers are more likely to ride—may have numerous handrails 1200.

The handrails 1200 may include an interior panel 1202 extending between the handrail 1200 and a lower portion of the modules 12, 14. The interior panel 1202 may provide structural support for the handrail 1200 along its length. The interior panel 1202 may be made from any suitable materials, including metal, plastic, glass, ceramic, and the like. The handrails 1200 may include components commonly found in handrails, such as a deck board, skirt guard, and moving belt along the rail which allows passengers 1101 to maintain a hold while riding the system 10.

The system 10 may also include a shade 1100, which may be a solid, semi-sold, or opaque structure above the passengers 1101. The shade 1100 may be useful for blocking or reducing sunlight incident upon passengers. The shade 110 may be made from any suitable material, including canvas, fabric, plastic, metal, wood, vinyl, and the like. The shade 1100 may be located along a portion of the system 10, for example, along at least one walkway module 12, 14. In one example, the shade 1100 may be positioned directly overhead of a passenger 1101 or at an angle to block or reduce sunlight at a desired time of day. In another example, the shade 1100 may be located along a particular module, such as module 12F within the array of walkways shown in FIG. 10. In another example, the shade 1100 may be located along any walkway 12 at particular locations, such as locations particularly vulnerable to harsh sunlight. It should be noted that the shade 1100 may also block or reduce other kinds of weather phenomena, such as wind, rain, hail, and dust.

Figure 12A:
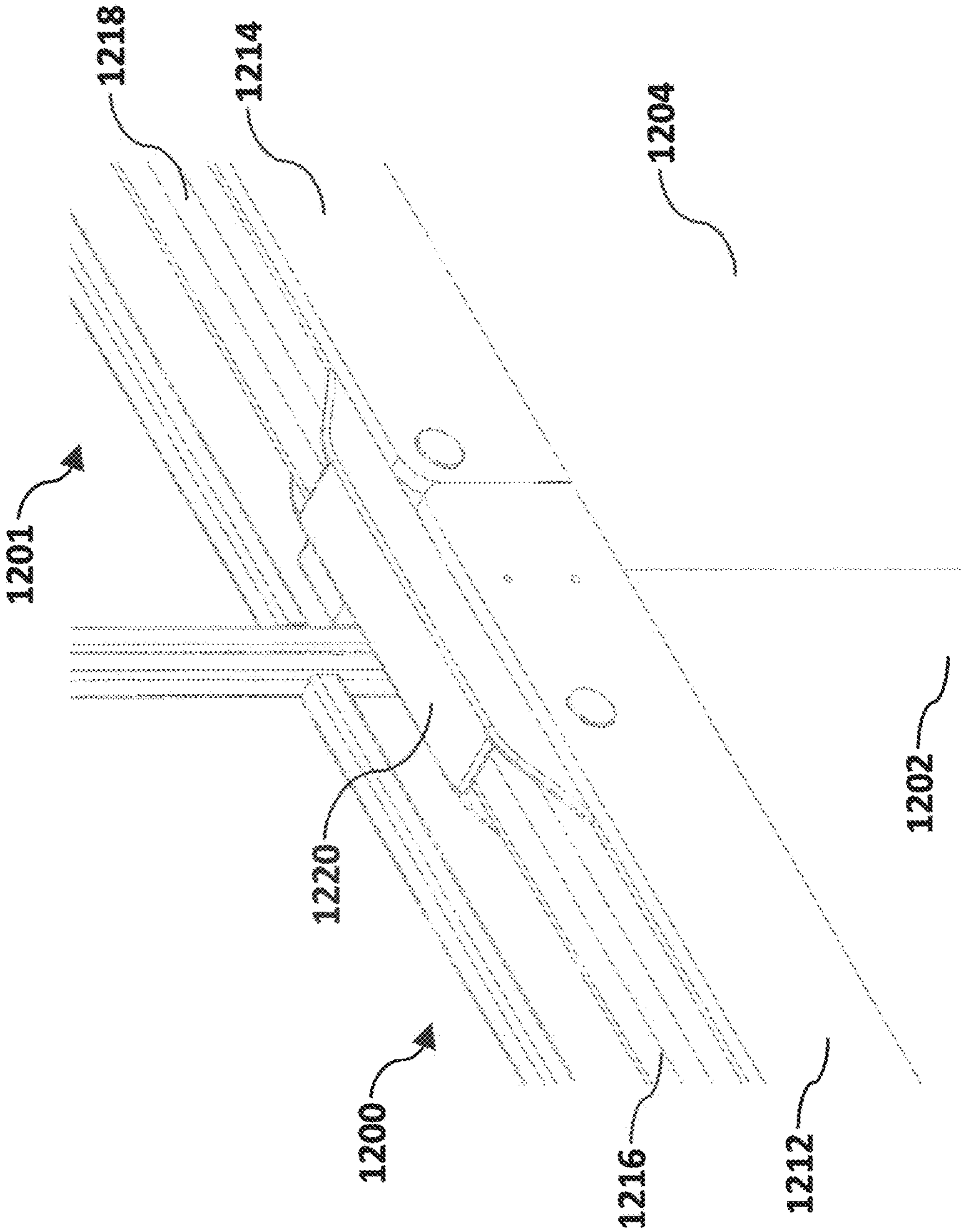
FIGS. 12A-12D are illustrations of a handrail strap toggle for the handrail shown in FIG. 11, in accordance with the first exemplary embodiment of the present disclosure.

FIGS. 12A-12D are illustrations of a handrail strap toggle 1220 for the handrail 1200 shown in FIG. 11, in accordance with the first exemplary embodiment of the present disclosure. FIG. 12A is an isometric illustration of the handrail strap toggle 1220 in use with the handrail 1200, 1201. As discussed above, each walkway module 12, 14 may be modular. Thus, each handrail 1200, 1201 may be modular to fit along with each walkway module 12, 14. The handrails 1200, 1201 may include rails 1212, 1214 and inner panels 1202, 1204, which may allow the handrails 1200, 1201 to be located at a suitable height for passengers to comfortably hold. At the junction between two adjacent handrails 1200, 1201, a handrail strap toggle 1220 may ensure a smooth transition. The handrail strap toggle 1220 may be located within the gap between adjacent handrails 1200, 1201. The top and sides of the handrail strap toggle 1220 may be made from a smooth, low-friction material to reduce rubbing as a passenger's hand slides across it. The handrail strap toggle 1220 may extend slightly above the belts 1216, 1218 and may extend out from the gap over the belts 1216, 1218 to hide the gap.

Figure 12C:
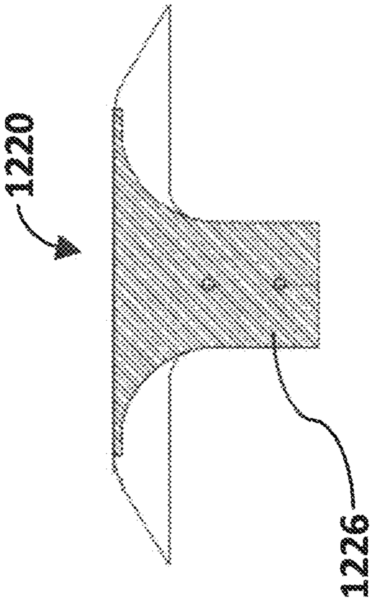
Figure 12D:
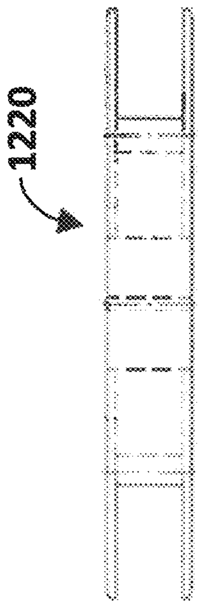
Figure 12B:
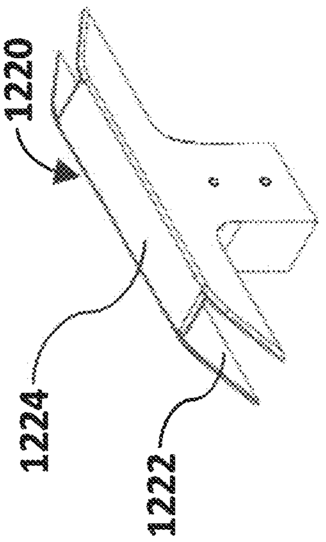

FIG. 12B is an isometric illustration of the handrail strap toggle 1220. FIG. 12C is a side-view illustration of the handrail strap toggle 1220. FIG. 12D is an overhead illustration of the handrail strap toggle 1220. The handrail strap toggle 1220 may include a base 1226, which fits in the gap between adjacent handrails 1200, 1201, arms 1222 extending at a T, i.e., perpendicular from the base 1226, and a top 1224 above the base 1226 and extending perpendicular to the base 1226. The base 1226 may be sized to fit within a channel of the rails 1212, 1214 and may be attached by any suitable means to the rails 1212, 1214, including fasteners, locking mechanisms, adhesives, and the like. The top 1224 may be connected to the base 1226 and may extend parallel with the rails 1212, 1214 and the belts 1216, 1218. The arms 1222 may be connected to the top 1224 and may extend over each side of each belt 1216, 1218 with a hollow space in between to allow the belts 1216, 1218 to travel through. The arms 1222 may be gently sloped, extending from the top 1224 to about the height of the belts 1216, 1218 to allow a smooth transition of the passenger's hand.

Figure 13:
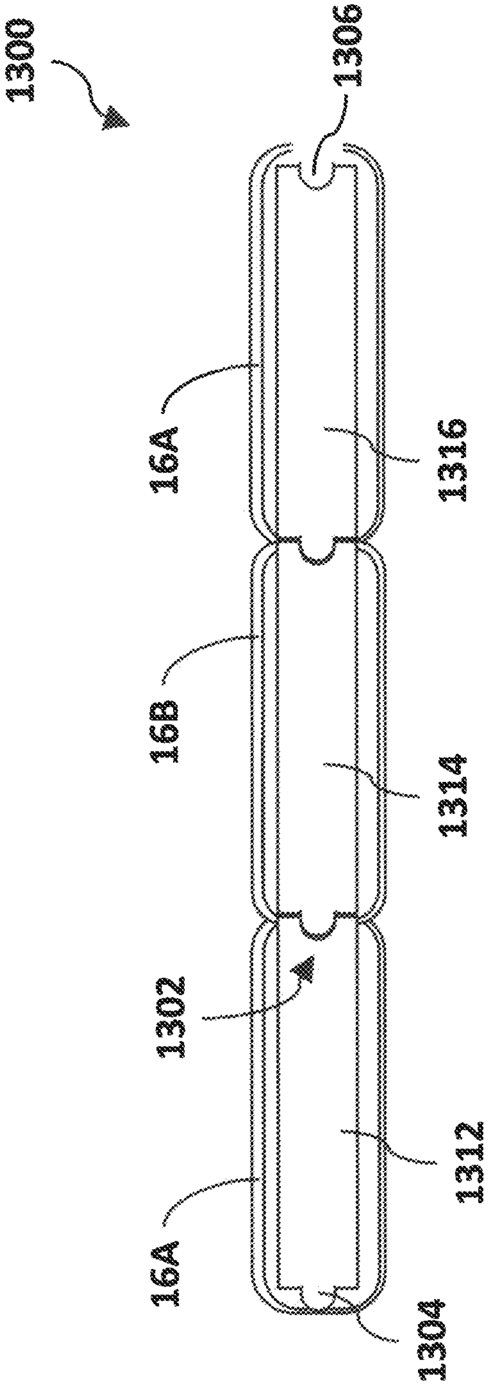
FIG. 13 is a diagrammatic illustration of interlocked walkway modules, in accordance with the first exemplary embodiment of the present disclosure.

FIG. 13 is a diagrammatic illustration of interlocked walkway modules 1300, in accordance with the first exemplary embodiment of the present disclosure. The interlocked walkway modules 1300 may include a plurality of walkway modules 1312, 1314, 1316 aligned and interconnected. The interlocking mechanism may be any suitable mechanism for aligning and maintaining a connection. For example, FIG. 13 shows the walkway modules 1312, 1314, 1316 connected by pressure fit 1302, similar to the way Legos® interlock. Each module 1312, 1314, 1316 may have a stud 1304 extending away from the module 1312, 1314, 1316. The stud 1304 may extend across at least a portion of the module 1312, 1314, 1316; for instance, at one or more points on the side of the module 1312, 1314, 1316. In one example, the stud 1304 may extend across substantially all of the module 1312, 1314, 1316 as a bar. The opposite side of each module 1312, 1314, 1316 may include a groove 1306 sized and located to match the stud 1304. The groove 1306 and the stud 1304 may fit together under pressure, i.e., the groove 1306 may apply a biased force against the stud 1304 when locked together. Each successive module 1312, 1314 may be connected to each successive module 1314, 1316 by interlocking each module's stud 1304 and groove 1306. In another example, the interlocking mechanism may be a tongue and groove mechanism, similar to the way puzzle pieces fit together. Each module 1312, 1314, 1316 may have a tongue on one end and a groove on the opposite end. The shape of the tongue and groove components may create a secure lock between adjacent pieces. Once they are interlocked, the adjacent belts 16A, 16B may operate as a walkway system 10 described above.

Depending on the shape, number, and location of each stud 1304 and groove 1306, the modules 1312, 1314, 1316 may be attached in a lateral or linear manner. For instance, if the studs 1304 and grooves 1306 are located in one or more discrete locations along a portion of the modules 1312, 1314, 1316, the modules 1312, 1314, 1316 may be attached in a linear manner, one pair of modules 1312, 1314 to another 1314, 1316. If the studs 1304 extend across a portion of the module 1312, 1314, 1316 in a linear fashion, the modules 1312, 1314, 1316 may be laterally connected, i.e., slid together from the side. If one or more of the modules 1312, 1314, 1316 should need to be repaired, replaced, or examined, workers may disconnect by interlocking modules 1300 by simply pulling or sliding them apart.

Figure 14B:
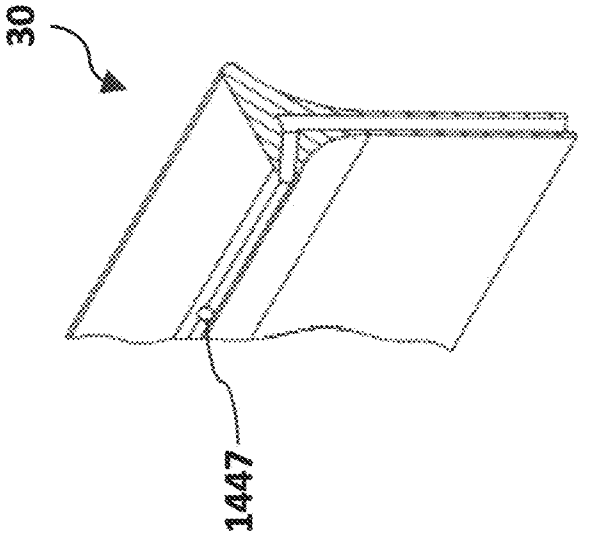
FIGS. 14A-14C are illustrations of a transition system having an air conduit and vents, in accordance with the first exemplary embodiment of the present disclosure.
Figure 14C:
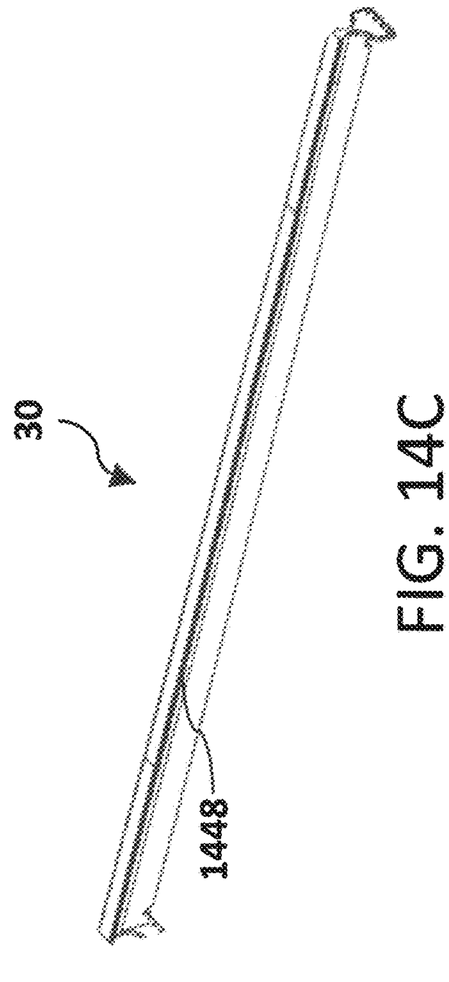
Figure 14A:
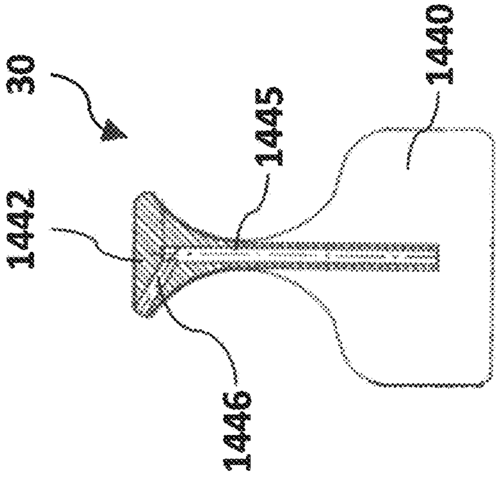

FIGS. 14A-14C are illustrations of a transition system 30 having an air conduit 1445, 1446 and vents 1447, 1448, in accordance with the first exemplary embodiment of the present disclosure. The transition system is shown in use with the variable speed moving walkway system 10 in FIG. 6C, above. FIG. 14A is a cross-sectional side view of the transition system 30 showing the vertical air conduit 1445, the angled air conduit 1446 and the base 1440. The base 1440 may be flared and may extend further than a top 1442. The base 1440 may be secured to the system 10 as described above. Within the base 1440 may be a vertical air conduit 1445, through which pressurized air may be pumped. The air may flow through the vertical air conduit 1445 and into the angled air conduit 1446. FIG. 14B shows an isometric cross-sectional illustration of the transition system 30. It can be seen in FIG. 14B that the air traveling through the vertical air conduit 1445 and angled air conduit 1446 may be expelled from the transition system 30 through one or more vents 1447 located along the width of the transition system 30. FIG. 14C shows a vent 1448 extending substantially across the entire transition system 30 in order to direct air across the width of the transition system 30. The directed air may travel along the belts 16A, 16B of the transition system 30 and upward in order to direct debris and other small objects away from the interior of the walkway modules 12, 14.

It should be emphasized that the above-described embodiments of the present disclosure, particularly, any "preferred" embodiments, are merely possible examples of implementations, merely set forth for a clear understanding of the principles of the disclosure. Many other variations and modifications may be made to the above-described embodiments of the disclosure without departing substantially from the spirit and principles of the disclosure. All such modifications and variations are intended to be included herein within the scope of the present disclosure and protected by the following claims.

What is claimed is:

1. A variable speed moving walkway system comprising:

at least two walkway modules, each having at least one belt moving at a different speed from that of a linearly adjacent walkway module;

a belt support apparatus for the at least one belt of each walkway module to ride on for supporting the weight of riders of the walkway modules, the belt support apparatus can be selected from a substantially planar plate or multiple rotatable rollers positioned between a first and a second outermost roller, wherein the at least one belt moves on the substantially planar plate or the multiple rotatable rollers; and a rubberized scrapper band positioned overlying an upper surface of the planar plate.

2. The variable speed moving walkway system of claim 1, wherein the rubberized scrapper band has opposing beveled edges.

3. The variable speed moving walkway system of claim 1, wherein the stationary planar plate includes a low friction interface that is composed of at least one of: polytetrafluoroethene (PTFE), stainless steel, a metallic compound, and/or a plastic.

4. The variable speed moving walkway system of claim 1 further comprising a transition T-bar positioned between the at least two walkway modules, the transition T-bar having a riser positioned at least partially between the at least two walkway modules and a horizontal plate connected to an elevated end of the riser, wherein the horizontal plate is positioned below a surface of the belt of each walkway module.

5. The variable speed moving walkway system of claim 4, further comprising a bracket connected to the riser, wherein the bracket is affixable to a wall positioned proximate to the at least two walkway modules.

6. A variable speed moving walkway system comprising:

a plurality of walkway modules, each having at least one movable belt, wherein each of the plurality of walkway modules are positioned immediately laterally adjacent to another, at least one of the walkway modules positioned laterally adjacent to another walkway module has at least one walkway module positioned linearly adjacent thereto, the multiple walkway modules positioned linearly adjacent and laterally adjacent to each other create an array of walkway modules; and wherein the at least one movable belt of each walkway module of the plurality of walkway modules is moving at a different speed from the at least one movable belt of an immediately laterally adjacent walkway module.

7. The variable speed moving walkway system of claim 6, wherein a separated distance between the at least two walkway modules is less than 3 cm.

8. The variable speed moving walkway system of claim 6, further comprising a transition system positioned between the at least two walkway modules that are positioned linearly adjacent to one another.

9. The variable speed moving walkway system of claim 8, wherein the transition system has:

a stationary wedge positioned between the at least one belt of each walkway module; and at least one rotational brush positioned in a gap formed between the stationary wedge and the at least one belt of each walkway module, respectively, wherein a rotational distance of the at least one rotational brush is at least as great as a rotational distance of an adjacent belt.

10. The variable speed moving walkway system of claim 8, wherein the transition system has a transition T-bar positioned between the at least two walkway modules, the transition T-bar having a riser positioned at least partially between the at least two walkway modules and a horizontal plate connected to an elevated end of the riser, wherein the horizontal plate is positioned below a surface of the belt of each walkway module.

11. The variable speed moving walkway system of claim 6 wherein the array creates multiple walkways positioned laterally adjacent to one another.

12. The variable speed moving walkway system of claim 11 wherein a speed of each walkway of the array can vary.

13. The variable speed moving walkway system of claim 11 wherein a speed of each walkway of the array increases from an exterior edge walkway of the array to an interior walkway of the array.

14. The variable speed moving walkway system of claim 6 wherein a speed of each walkway module of the array can vary.

* * * * *